United States Patent
Lou et al.

(10) Patent No.: US 11,464,040 B2
(45) Date of Patent: Oct. 4, 2022

(54) DATA TRANSMISSION METHOD AND APPARATUS

(71) Applicant: HUAWEI TECHNOLOGIES CO., LTD., Guangdong (CN)

(72) Inventors: Chong Lou, Shanghai (CN); Jingrui Guo, Shanghai (CN); Xing Liu, Shenzhen (CN); Xiaoying Xu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 6 days.

(21) Appl. No.: 17/126,470

(22) Filed: Dec. 18, 2020

(65) Prior Publication Data
US 2021/0105086 A1 Apr. 8, 2021

Related U.S. Application Data

(63) Continuation of application No. PCT/CN2019/091988, filed on Jun. 20, 2019.

(30) Foreign Application Priority Data

Jun. 20, 2018 (CN) .......................... 201810638840.9

(51) Int. Cl.
*H04W 72/12* (2009.01)
*H04L 1/00* (2006.01)
(Continued)

(52) U.S. Cl.
CPC ....... *H04W 72/1294* (2013.01); *H04L 1/0005* (2013.01); *H04L 1/0007* (2013.01);
(Continued)

(58) Field of Classification Search
CPC ......... H04W 72/1294; H04W 72/1252; H04W 72/1268; H04W 72/14; H04L 1/0005;
(Continued)

(56) References Cited

U.S. PATENT DOCUMENTS 9,379,844 B2 * 6/2016 Zhang ................... H04L 1/0029
11,102,764 B2 * 8/2021 Shrestha ........... H04W 72/0413
(Continued)

FOREIGN PATENT DOCUMENTS

| CN | 108024378 A | 5/2018 |
|---|---|---|
| CN | 108076455 A | 5/2018 |

(Continued)

OTHER PUBLICATIONS

Huawei et al.,"Feature lead summary of EDT during RACH in feNB-IoT",3GPP TSG RAN WG1 Meeting #92 R1-1803007,Athens, Greece, Feb. 26-Mar. 2, 2018,Total 8 Pages.
(Continued)

*Primary Examiner* — Min Jung
(74) *Attorney, Agent, or Firm* — Womble Bond Dickinson (US) LLP

(57) ABSTRACT

A data transmission method includes: receiving an uplink grant message from a network device, where the uplink grant message includes first information, and the first information corresponds to a plurality of transport block sizes; determining the plurality of transport block sizes based on the first information; determining, based on a size of to-be-sent data, a first transport block size from the plurality of transport block sizes; and sending the to-be-sent data to the network device based on the first transport block size.

20 Claims, 11 Drawing Sheets

(51) Int. Cl.
*H04L 1/18* (2006.01)
*H04W 72/14* (2009.01)

(52) U.S. Cl.
CPC ....... *H04L 1/1819* (2013.01); *H04W 72/1252* (2013.01); *H04W 72/1268* (2013.01); *H04W 72/14* (2013.01)

(58) Field of Classification Search
CPC ... H04L 1/0007; H04L 1/1819; H04L 1/0016; H04L 5/0046
See application file for complete search history.

(56) References Cited

U.S. PATENT DOCUMENTS

| | | | |
|---|---|---|---|
| 2011/0164574 A1 | 7/2011 | Rao et al. | |
| 2017/0223686 A1* | 8/2017 | You | H04L 5/005 |
| 2018/0167931 A1 | 6/2018 | Papasakellariou | |
| 2018/0375630 A1* | 12/2018 | Kim | H04W 72/042 |
| 2019/0260440 A1* | 8/2019 | Davydov | H04L 1/0007 |
| 2021/0274566 A1* | 9/2021 | Charbit | H04L 5/0053 |

FOREIGN PATENT DOCUMENTS

| | | |
|---|---|---|
| CN | 108141890 A | 6/2018 |
| CN | 110062474 A | 7/2019 |
| EP | 3742858 A1 | 11/2020 |
| WO | 2018059557 A1 | 4/2018 |

OTHER PUBLICATIONS

Samsung,"Early data transmission for eMTC",3GPP TSG RAN WG1 Meeting #92bis R1-1804325 Sanya, China, Apr. 16, 20, 2018 Total 5 Pages.

Xiaomi Communications,"Discussion on remaining issues of EDT for NB-IoT",3GPP TSG RAN WG1 Meeting #93 R1-1807137,Busan, Korea, May 21, 25, 2018,Total 4 Pages.

MediaTek Inc.,"Early Data Transmission TBS Determination",3GPP TSG RAN WG2 Meeting #101 R2-1802603, Athens, Greece, Feb. 26-Mar. 2, 2018,Total 6 Pages.

Ericsson TB sizes and UL grant for Msg3 3GPP TSG-RAN WG2 #101 R2-1803080,Athens, Greece, Feb. 26 Mar. 2, 2018,total 5 pages.

* cited by examiner

DATA TRANSMISSION METHOD AND APPARATUS

CROSS-REFERENCE TO RELATED APPLICATIONS

This application is a continuation of International Application No. PCT/CN2019/091988, filed on Jun. 20, 2019, which claims priority to Chinese Patent Application No. 201810638840.9, filed on Jun. 20, 2018. The disclosures of the aforementioned applications are hereby incorporated by reference in their entireties.

TECHNICAL FIELD

This application relates to the communications field, and more specifically, to a data transmission method and apparatus.

BACKGROUND

Typical 5G scenario cases of the third generation partnership project (3GPP) are summarized into the following three types: an enhanced mobile broadband (eMBB) service, a massive machine-type communication (mMTC) service, and an ultra-reliable and low-latency communications (URLLC) service, where the URLLC is oriented to services that have rigorous requirements on reliability and a latency of data transmission, for example, scenarios such as the internet of vehicles and industrial control, and new services such as future virtual reality (VR) and augmented reality (AR). How to improve data transmission reliability while reducing a transmission latency in a data transmission process becomes a new problem of the URLLC service.

Currently, in a non-dynamic scheduling process, because a network device cannot learn of a size of to-be-sent data of a terminal in advance, a problem that a size of a resource indicated by the network device does not match a size of actual to-be-sent data of the terminal may exist. If the network device allocates a relatively large resource, the actual to-be-sent data of the terminal cannot completely fill the resource indicated by the network device, and padding bits need to be sent for completely filling the resource. A relatively large amount of padding bits results in additional uplink sending duration of the terminal, and consequently, relatively high energy consumption is generated, and air interface resource utilization is reduced.

SUMMARY

In view of this, this application provides a data transmission method and apparatus, to improve air interface resource utilization and data transmission reliability.

According to a first aspect, a data transmission method is provided. The method includes:

A terminal receives an uplink grant message from a network device, where the uplink grant message includes first information, and the first information corresponds to a plurality of transport block sizes.

The terminal determines the plurality of transport block sizes based on the first information.

The terminal determines, based on a size of to-be-sent data, a first transport block size from the plurality of transport block sizes.

The terminal sends the to-be-sent data to the network device based on the first transport block size.

In an embodiment, the to-be-sent data may include control plane signaling.

In an embodiment, the control plane signaling is a radio resource control (RRC) message, and the RRC message includes an RRC connection setup request, an RRC resume request, or the like.

In an embodiment, the to-be-sent data may include control plane signaling.

In an embodiment, the control plane signaling is a cell radio network temporary identifier (C-RNTI).

In an embodiment, the to-be-sent data may include user plane data.

According to the data transmission method in this embodiment of this application, the first information corresponds to the plurality of transport block sizes, and an appropriate transport block size is selected based on the size of the to-be-sent data. This helps improve flexibility of data transmission, thereby improving air interface resource utilization and data transmission reliability.

With reference to the first aspect, in some embodiments of the first aspect, the first information includes a modulation and coding scheme index, and the modulation and coding scheme index corresponds to the plurality of transport block sizes.

In an embodiment of this application, an information element supported in an existing protocol is used to establish a correspondence between the information element and the plurality of transport block sizes, thereby helping reduce air interface overheads.

In an embodiment, the first information is a newly added information element in the uplink grant message, and the newly added information element corresponds to the plurality of transport block sizes.

With reference to the first aspect, in some embodiments of the first aspect, the determining, by the terminal, the plurality of transport block sizes based on the first information includes:

The terminal determines the plurality of transport block sizes based on a preset correspondence between the first information and the plurality of transport block sizes.

With reference to the first aspect, in some embodiments of the first aspect, the method further includes:

The terminal receives, from the network device, a correspondence between the first information and the plurality of transport block sizes.

In addition, the determining the plurality of transport block sizes based on the first information includes:

determining the plurality of transport block sizes based on the correspondence between the first information and the plurality of transport block sizes.

In an embodiment, the correspondence between the first information and the plurality of transport block sizes is predefined in a protocol.

With reference to the first aspect, in some embodiments of the first aspect, the plurality of transport block sizes are identified by transport block size indexes.

With reference to the first aspect, in some embodiments of the first aspect, the sending, by the terminal, the to-be-sent data to the network device based on the first transport block size includes:

The terminal determines a repetition quantity of the to-be-sent data based on the first transport block size.

The terminal sends, on an uplink resource granted by the uplink grant message, the to-be-sent data to the network device for the repetition quantity of times by using the first transport block size.

In an embodiment, when the size of the to-be-sent data is less than half of a size of the uplink resource, the terminal repeatedly sends the to-be-sent data to the network device by using the first transport block size.

In an embodiment, when the first transport block size is greater than or equal to one third of the uplink resource and less than or equal to half of the uplink resource, the repetition quantity is 2.

In an embodiment, when the first transport block size is greater than or equal to one fourth of the uplink resource and less than or equal to one third of the uplink resource, the repetition quantity is 3.

According to the data transmission method in this embodiment of this application, the terminal repeatedly sends the data to the network device. This helps improve air interface resource utilization and data transmission reliability.

With reference to the first aspect, in some embodiments of the first aspect, the determining, by the terminal, a repetition quantity of the to-be-sent data based on the first transport block size includes:

The terminal determines, based on the first transport block size and a correspondence between a transport block size and a repetition quantity, that a repetition quantity corresponding to the first transport block size is the repetition quantity of the to-be-sent data.

With reference to the first aspect, in some embodiments of the first aspect, the correspondence between the transport block size and the repetition quantity is preset or is from the network device.

In an embodiment, the correspondence between the transport block size and the repetition quantity is predefined in the protocol.

With reference to the first aspect, in some embodiments of the first aspect, the sending, by the terminal, the to-be-sent data to the network device for the repetition quantity of times by using the first transport block size includes:

forming, at a first protocol layer based on the first transport block size, the to-be-sent data into a first protocol layer protocol data unit, and indicating new transmission of a hybrid automatic repeat request (HARQ) process corresponding to the first protocol layer protocol data unit; and indicating, at the first protocol layer, repetition transmission of the first protocol layer protocol data unit in the HARQ process.

In an embodiment, the HARQ process is a process 0.

In an embodiment, the HARQ process is predefined in the protocol.

In an embodiment, the HARQ process is indicated by the network device.

In an embodiment, the HARQ process is obtained by the terminal through calculation based on configuration information from the network device.

In an embodiment, the first protocol layer is a media access control layer.

In an embodiment, the second protocol layer is a physical layer.

In an embodiment, the first protocol layer protocol data unit is a media access control layer protocol data unit (MAC PDU).

With reference to the first aspect, in some embodiments of the first aspect, the sending, by the terminal, the to-be-sent data to the network device for the repetition quantity of times by using the first transport block size includes:

forming, at a first protocol layer, the to-be-sent data into a first protocol layer payload for the repetition quantity of times; and forming the first protocol layer payload into a first protocol layer protocol data unit, and indicating new transmission of a HARQ process corresponding to the first protocol layer protocol data unit.

In an embodiment, the first protocol layer payload is a media access control layer payload (MAC payload).

In an embodiment, the first protocol layer protocol data unit is a media access control layer protocol data unit (MAC PDU).

With reference to the first aspect, in some embodiments of the first aspect, the first protocol layer protocol data unit includes at least one first protocol layer control element and/or at least one first protocol layer service data unit.

In an embodiment, the MAC PDU includes at least one MAC payload and/or at least one media access control layer service data unit (MAC SDU).

With reference to the first aspect, in some embodiments of the first aspect, the sending, by the terminal, the to-be-sent data to the network device for the repetition quantity of times by using the first transport block size includes:

forming, at a first protocol layer, the to-be-sent data into a first protocol layer sub-protocol data unit for the repetition quantity of times; and forming the first protocol layer sub-protocol data unit into a first protocol layer protocol data unit, and indicating new transmission of a HARQ process corresponding to the first protocol layer protocol data unit.

In an embodiment, the first protocol layer sub-protocol data unit is a media access control layer sub-protocol data unit (MAC subPDU).

In an embodiment, the first protocol layer protocol data unit is a media access control layer protocol data unit (MAC PDU).

With reference to the first aspect, in some embodiments of the first aspect, a subheader of the first protocol layer sub-protocol data unit includes an indication information element, and the indication information element is used to indicate whether the first protocol layer sub-protocol data unit is a repeated protocol data unit.

With reference to the first aspect, in some embodiments of the first aspect, the determining, by the terminal based on a size of to-be-sent data, a first transport block size from the plurality of transport block sizes includes:

determining, at the first protocol layer based on the size of the to-be-sent data, the first transport block size from the plurality of transport block sizes.

In an embodiment, the terminal determines the repetition quantity at the first protocol layer.

With reference to the first aspect, in some embodiments of the first aspect, the determining, by the terminal based on a size of to-be-sent data, a first transport block size from the plurality of transport block sizes includes:

determining, at the first protocol layer, the size of the to-be-sent data; and determining, at a second protocol layer based on the size of the to-be-sent data, the first transport block size from the plurality of transport block sizes.

In an embodiment, the terminal determines the repetition quantity at the second protocol layer.

With reference to the first aspect, in some embodiments of the first aspect, the receiving, by a terminal, an uplink grant message from a network device includes:

The terminal receives a random access process message 2 sent by the network device in a random access process, where the random access process message 2 includes the uplink grant message.

The sending, by the terminal, the to-be-sent data to the network device based on the first transport block size includes:

The terminal sends a random access process message 3 to the network device based on the first transport block size, where the random access process message 3 includes the to-be-sent data.

In an embodiment, the random access process message 2 may also be referred to as a random access response message.

With reference to the first aspect, in some embodiments of the first aspect, the receiving, by a terminal, an uplink grant message from a network device includes:

The terminal receives RRC signaling sent by the network device, where the RRC signaling includes the uplink grant message.

The sending, by the terminal, the to-be-sent data to the network device based on the first transport block size includes:

The terminal sends a random access process message 1 to the network device based on the first transport block size, where the random access process message 1 includes the to-be-sent data.

In an embodiment, the random access process message 1 may also be referred to as a random access request message.

With reference to the first aspect, in some embodiments of the first aspect, the receiving, by a terminal, an uplink grant message from a network device includes:

The terminal receives radio resource control (RRC) signaling from the network device, where the RRC signaling includes the uplink grant message.

Alternatively, the terminal receives RRC signaling and downlink control information (DCI) from the network device, where the RRC signaling includes configuration information of the uplink grant message, and the DCI includes the uplink grant message.

According to a second aspect, a data transmission method is provided. The method includes:

A network device sends an uplink grant message to a terminal, where the uplink grant message includes first information, and the first information corresponds to a plurality of transport block sizes.

The network device receives data sent by the terminal based on a first transport block size, where the plurality of transport block sizes include the first transport block size.

With reference to the second aspect, in some embodiments of the second aspect, the method further includes:

The network device sends a correspondence between the first information and the plurality of transport block sizes to the terminal.

With reference to the second aspect, in some embodiments of the second aspect, the method further includes:

The network device sends a correspondence between a transport block size and a repetition quantity to the terminal, where the repetition quantity is a quantity of times the data is repeatedly sent.

With reference to the second aspect, in some embodiments of the second aspect, the method further includes:

The network device sends indication information to the terminal if the data fails to be received, where the indication information is used to indicate the terminal to repeatedly send the data.

With reference to the second aspect, in some embodiments of the second aspect, the method further includes:

The network device sends indication information to the terminal if the data fails to be received, where the indication information is used to indicate a first uplink grant resource, and the first uplink grant resource is used to send the data once.

According to a third aspect, a data transmission apparatus is provided. The apparatus includes units or means configured to perform the operations in the first aspect.

According to a fourth aspect, a data transmission apparatus is provided. The apparatus includes units or means configured to perform the operations in the second aspect.

According to a fifth aspect, a data transmission apparatus is provided. The apparatus includes at least one processor and a memory, and the at least one processor is configured to perform the method according to the first aspect.

According to a sixth aspect, a data transmission apparatus is provided. The apparatus includes at least one processor and a memory, and the at least one processor is configured to perform the method according to the second aspect.

According to a seventh aspect, a data transmission apparatus is provided. The apparatus includes at least one processor and an interface circuit, and the at least one processor is configured to perform the method according to the first aspect.

According to an eighth aspect, a data transmission apparatus is provided. The apparatus includes at least one processor and an interface circuit, and the at least one processor is configured to perform the method according to the second aspect.

According to a ninth aspect, a terminal is provided. The terminal includes the apparatus according to the third aspect, or the terminal includes the apparatus according to the fifth aspect, or the terminal includes the apparatus according to the seventh aspect.

According to a tenth aspect, a program is provided. When being executed by a processor, the program is used to perform the method according to the first aspect or the second aspect.

According to an eleventh aspect, this application provides a program product, for example, a computer-readable storage medium, including the program in the tenth aspect.

DESCRIPTION OF EMBODIMENTS

Figure 1:
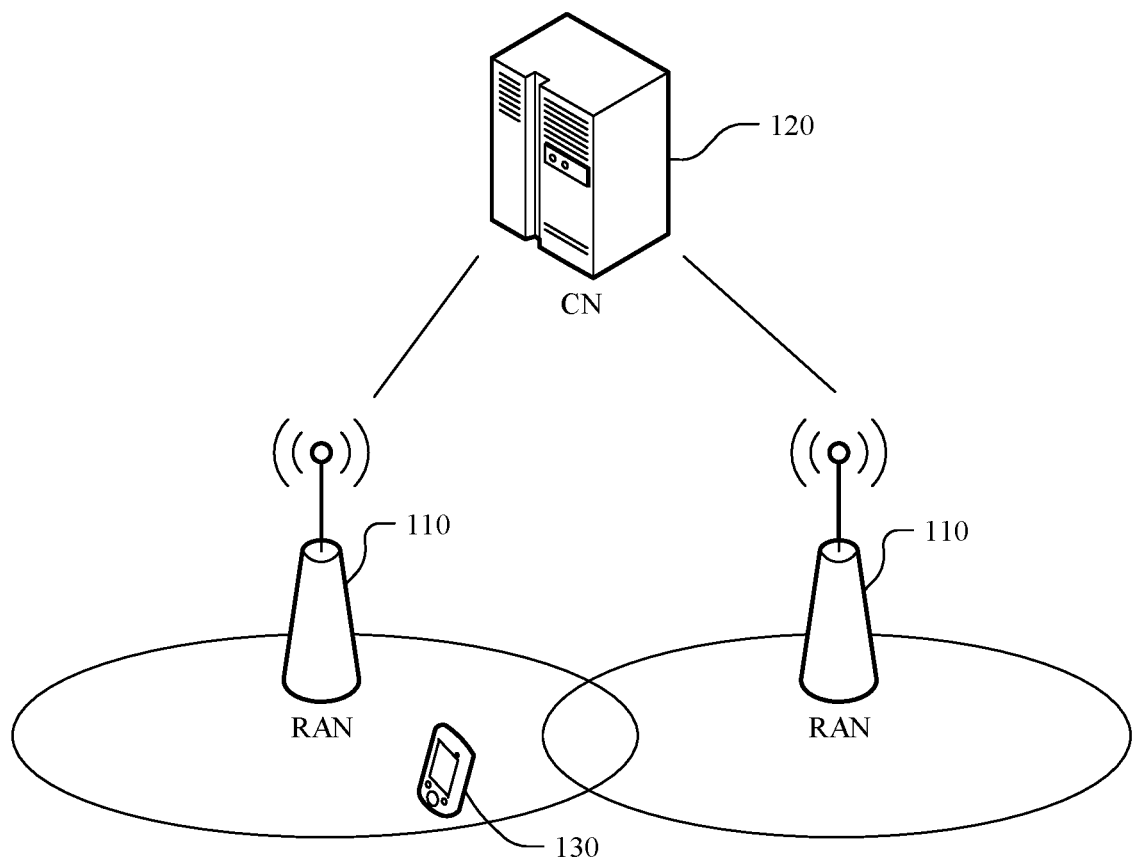
FIG. 1 is a schematic diagram of a communications system according to an embodiment of this application.

The following describes some terms in this application.

(1) A terminal, also referred to as user equipment (UE), a mobile station (MS), a mobile terminal (MT), or the like, is a device that provides voice/data connectivity for a user, for example, a handheld device or a vehicle-mounted device having a wireless connection function. Currently, for example, the terminal is a mobile phone, a tablet computer, a notebook computer, a palmtop, a mobile internet device (MID), a wearable device, a virtual reality (VR) device, an augmented reality (AR) device, a wireless terminal in industrial control, a wireless terminal in self driving, a wireless terminal in a remote surgery, a wireless terminal in a smart grid, a wireless terminal in transportation safety, a wireless terminal in a smart city, or a wireless terminal in a smart home.

(2) A network device is a device in a wireless network, for example, a radio access network (RAN) node that enables a terminal to access the wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The technical solutions of the embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

Before the embodiments of this application are described, several related concepts in a hybrid automatic repeat request (HARQ) are first briefly described.

HARQ process: HARQ uses a stop-and-wait protocol to send data. In the stop-and-wait protocol, after sending a transport block (TB), a transmit end stops to wait for feedback information, and performs acknowledgment (ACK) or negative acknowledgment (NACK) on the TB. However, the transmit end stops to wait for acknowledgment after each transmission, which results in a very low throughput. Therefore, long term evolution (LTE) and new radio (NR) of a 5G communications system specify that a terminal may use a plurality of parallel HARQ processes. When one HARQ process is waiting for acknowledgment information, the transmit end may use another HARQ process to continue to send data.

HARQ entity: These HARQ processes together form a HARQ entity. This entity combines the stop-and-wait protocol, and allows continuous data transmission. Each terminal has one HARQ entity. However, in carrier aggregation (CA), each component carrier corresponding to one terminal may have a HARQ entity. Each HARQ process processes only one TB in one transmission time unit. Each HARQ process has an independent HARQ buffer at a receive end, to perform soft combination on received data. In spatial multiplexing, two TBs are transmitted in parallel in one TTI. In this case, each TB has independent HARQ acknowledgment information, and one HARQ entity includes two HARQ process sets.

HARQ process number: The HARQ process number is also referred to as a HARQ process ID, and uniquely specifies one HARQ process.

Redundancy version (RV): The redundancy version is used to indicate a redundancy version used for transmission, and a value of the redundancy version ranges from 0 to 3.

Modulation and coding scheme (MCS): In LTE, downlink control information (DCI) uses a 5-bit MCS index (0-31) to indicate a modulation and coding scheme used for current transmission, and affects selection of a TB size (TBS). There are 32 combinations for the MCS in total. Three combinations (whose indexes are 29 to 31) are reserved, and the three combinations are used only for retransmission.

Scheduling process: The network device may schedule the terminal to perform uplink transmission in two manners: dynamic scheduling and preconfigured resource scheduling. For example, the network device indicates, by sending a dynamic UL grant or a preconfigured UL grant, the terminal to send uplink data.

Dynamic scheduling: The network device sends an uplink scheduling grant (uplink grant, UL grant), sends DCI, that is, a dynamic UL grant, on a physical downlink control channel (PDCCH), that is scrambled by using a terminal identifier. If successfully decoding the control information, the terminal may obtain a size of a physical layer resource corresponding to this uplink scheduling, time domain/frequency domain distribution of the physical layer resource, and HARQ information required for this uplink scheduling transmission. Therefore, the terminal performs the HARQ process to complete uplink transmission.

Preconfigured resource scheduling: The network device may preconfigure, in a semi-static resource allocation manner, a resource required by the terminal for uplink transmission, that is, preconfigure a UL grant. It should be understood that the preconfigured UL grant may appear periodically, and the terminal does not need to obtain an uplink grant each time before uplink transmission. For example, the network device may configure a UL grant for uplink transmission by using radio resource control (RRC) signaling, and the RRC signaling may include a period of the preconfigured UL grant, so that the terminal performs transmission on the preconfigured resource. This manner may be a configured grant type 1. The network device may configure part information of a UL grant for uplink transmission, for example, preconfigure a period of the UL grant, by using RRC signaling, and carry the UL grant for uplink transmission in physical layer signaling and activate a resource for the uplink transmission, so that the terminal performs transmission on the preconfigured resource. This manner may be a configured grant type 2, and both the foregoing two types may be referred to as preconfigured resource scheduling.

It should be noted that, in embodiments of this application, the "uplink grant" and the "uplink grant message" may be understood as signaling used to schedule a physical uplink resource, for example, downlink control information used for the uplink grant, or RRC signaling used for a semi-static configuration, or downlink control information used to activate an uplink grant resource in a semi-static configuration manner. The "uplink grant resource" may be understood as a resource indicated by the uplink grant. In an LTE or NR protocol, the "uplink grant", the "uplink grant message", and the "uplink grant resource" may all correspondingly be the UL grant, and a person skilled in the art may understand meanings of the "uplink grant", the "uplink grant message", and the "uplink grant resource".

It should be further noted that in the embodiments of this application, the "protocol" may be a standard protocol in the communications field, for example, the "protocol" may include an LTE protocol, an NR protocol, and a related protocol applied to a future communications system. This is not limited in this application.

It should be further noted that, in the following embodiments, terms such as "first" and "second" are merely intended to distinguish between different objects, and should not constitute any limitation on this application.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means "one" or "more". "At least one" means one or more; "At least one of A and B", similar to "A and/or B", describes an association relationship between the associated objects, and indicates that three relationships may exist. For example, at least one of A and B may represent the following three cases: Only A exists, both A and B exist, and only B exists.

FIG. 1 is a schematic diagram of a communications system 100 according to an embodiment of this application. As shown in FIG. 1, a terminal 130 accesses a wireless network to obtain a service of an external network (for example, the internet) via the wireless network, or communicates with another terminal via the wireless network. The wireless network includes a RAN 110 and a core network (CN) 120. The RAN 110 is used to connect the terminal 130 to the wireless network, and the CN 120 is used to manage the terminal and provide a gateway for communicating with the external network.

It should be understood that the data transmission method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal 130 shown in FIG. 1, for example, may be the terminal 130 in FIG. 1, or may be a chip configured in the terminal 130. The other communications apparatus in the two communications apparatuses may correspond to the RAN 110 shown in FIG. 1, for example, may be the RAN 110 in FIG. 1, or may be a chip configured in the RAN 110.

Figure 2:
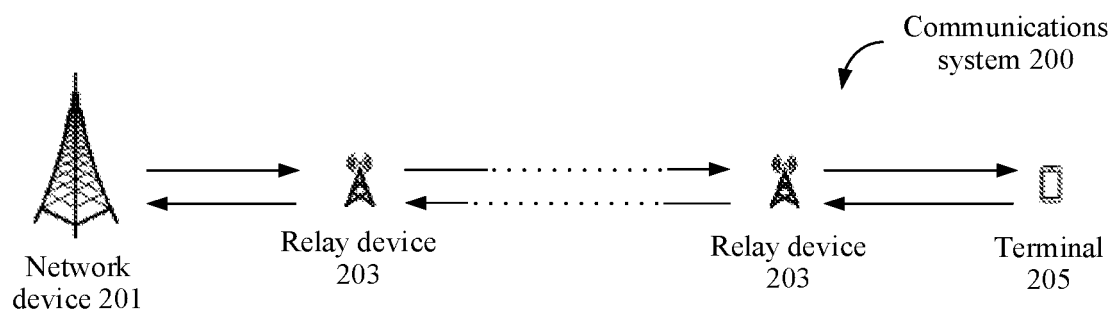
FIG. 2 is another schematic diagram of a communications system according to an embodiment of this application.

FIG. 2 is a schematic diagram of another communications system 200 according to an embodiment of this application. The communications system 200 may be an LTE system, or may be a future evolved 5G system, a new radio (NR) system, a machine to machine communications (M2M) system, or the like. As shown in FIG. 2, the wireless communications system 200 may include a network device 201, a terminal 205, and a relay device 203. The wireless communications system 200 includes a single-hop relay system or a multi-hop relay system. In the multi-hop relay system, referring to FIG. 2, there are at least two relay devices 203 between the network device 201 and the terminal 205. However, in the single-hop relay system, there is only one relay device 203 between the network device 201 and the terminal 205.

The network device may be configured to communicate with one or more terminals, or may be configured to communicate with one or more network devices that have a part of a terminal function (for example, communication between a macro base station and a micro base station, such as an access point (AP)).

The relay device may be a relay base station, for example, a micro base station. Alternatively, the relay device may be a terminal that provides a relay function. Alternatively, the relay device may be a network entity such as a relay transceiver node, customer premise equipment (CPE), a relay transceiver, a relay agent, a transmission reception point (TRP), or a relay transmission reception point (rTRP). During specific implementation, the relay device may be distributed on an edge of a cell, and a coverage area of the network device may be expanded. Alternatively, the relay device may be a network device that provides a relay function.

In the wireless communications system 200, the relay device 203 between the network device 201 and the terminal 205 may be configured to forward a radio signal between the network device 201 and the terminal 205. Specifically, during downlink transmission, the relay device 203 is responsible for forwarding a radio signal transmitted by the network device 201, to finally transmit the radio signal to the terminal 205. During uplink transmission, the relay device 203 is responsible for forwarding a radio signal transmitted by the terminal 205, to finally transmit the radio signal to the network device 201.

It should be noted that the wireless communications system 200 shown in FIG. 2 is merely intended to more clearly describe technical solutions in this application, but is not intended to limit this application. A person of ordinary skill in the art may know that as a network architecture evolves and a new service scenario emerges, the technical solutions provided in this application are further applicable to a similar technical problem.

Without loss of generality, the following describes the embodiments of this application in detail by using an interaction process between a terminal and a network device as an example. It may be understood that any terminal in a wireless communications system may communicate, based on a same method, with one or more network devices having a wireless communication connection. This is not limited in this application.

It should be understood that, for the communications system shown in FIG. 1, the network device may be the RAN 110 in FIG. 1, and the terminal may be the terminal 130 in FIG. 1.

It should be further understood that, for the communications system shown in FIG. 2, the network device may be the network device 201 in FIG. 2, and the terminal may be the relay node 203 (or a terminal having a relay node function) in FIG. 2. Alternatively, the network device may be the relay node 203 in FIG. 2, and the terminal may be the terminal 205 in FIG. 2.

Figure 3:
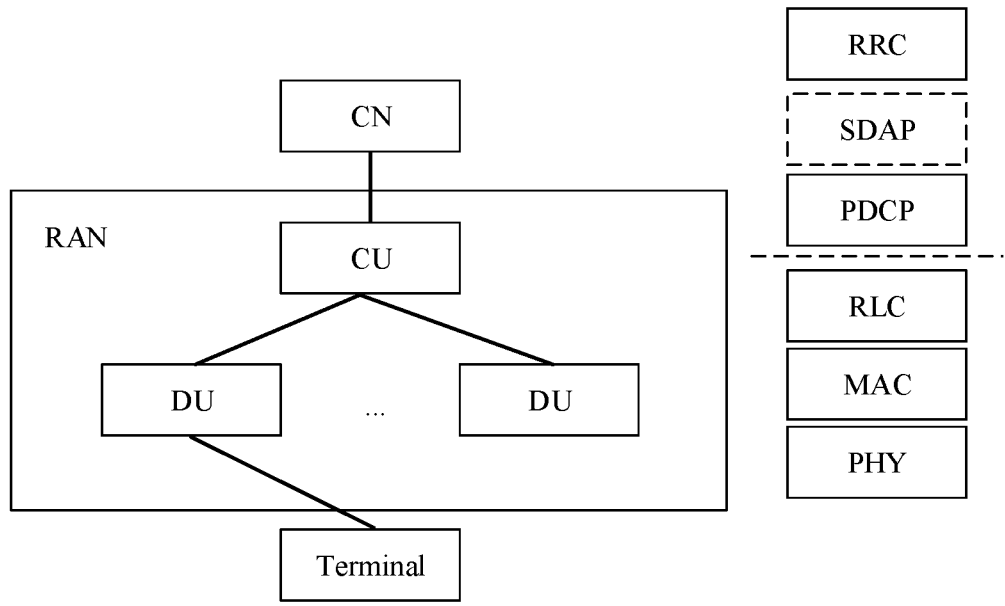
FIG. 3 is a schematic diagram of a network architecture according to an embodiment of this application.

FIG. 3 is a schematic diagram of a network architecture according to an embodiment of this application. As shown in FIG. 3, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or parts of the radio frequency apparatus are implemented remotely from the baseband apparatus and remaining parts of the radio frequency apparatus are integrated into the baseband apparatus. For example, in an LTE communications system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an embodiment, a service data adaptation protocol (SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU), and a plurality of DUs may be centrally controlled by one CU. As shown in FIG. 3, the CU and the DU may be divided based on a protocol layer of a wireless network. For example, functions of the PDCP layer and protocol layers above the PDCP layer are set on the CU, and functions of protocol layers below the PDCP layer, such as the RLC layer and the MAC layer, are set on the DU.

Division based on the protocol layer is merely an example, and division may alternatively be performed at another protocol layer, for example, the RLC layer. Functions of the RLC layer and protocol layers above the RLC layer are set on the CU, and functions of protocol layers below the RLC layer are set on the DU. Alternatively, division is performed in a protocol layer, for example, some functions of the RLC layer and functions of protocol layers above the RLC layer are set on the CU, and remaining functions of the RLC layer and functions of protocol layers below the RLC layer are set on the DU. In addition, division may alternatively be performed in another manner, for example, the division is performed based on latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or parts of the radio frequency apparatus are disposed remotely from the baseband apparatus and remaining parts of the radio frequency apparatus are integrated into the DU. This is not limited herein.

Figure 4:
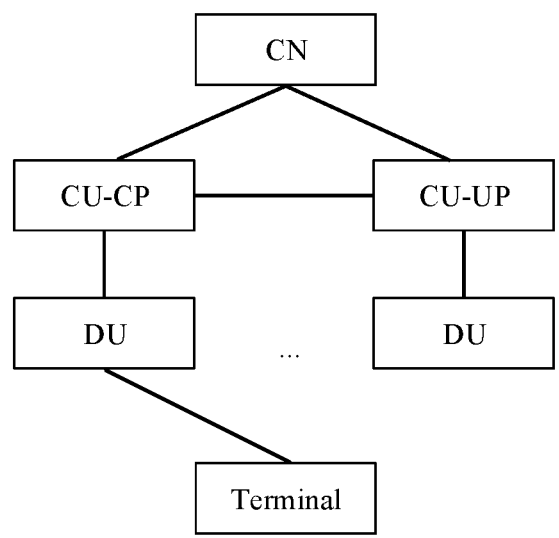
FIG. 4 is a schematic diagram of another network architecture according to an embodiment of this application.

FIG. 4 is a schematic diagram of another network architecture according to an embodiment of this application. Compared with the architecture shown in FIG. 3, a control plane (CP) and a user plane (UP) of a CU may be further separated into different entities for implementation, and the different entities are a control plane CU entity (CU-CP entity) and a user plane CU entity (CU-UP entity).

In the foregoing network architecture, signaling generated by the CU may be sent to a terminal via a DU, or signaling generated by a terminal may be sent to the CU via a DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at an RRC layer or a PDCP layer is finally processed as signaling at a PHY layer and sent to the terminal, or is converted from received signaling at a PHY layer. In this architecture, the signaling at the RRC layer or the PDCP layer may also be considered to be sent by the DU, or sent by the DU and a radio frequency.

In the foregoing embodiments, the CU is classified as a network device on a RAN side. In addition, the CU may alternatively be classified as a network device on a CN side. This is not limited herein.

An apparatus in the following embodiments of this application may be located in a terminal or a network device based on functions implemented by the apparatus. When the foregoing CU-DU structure is used, the network device may be a CU node, a DU node, or a RAN device including a CU node and a DU node.

Figure 5:
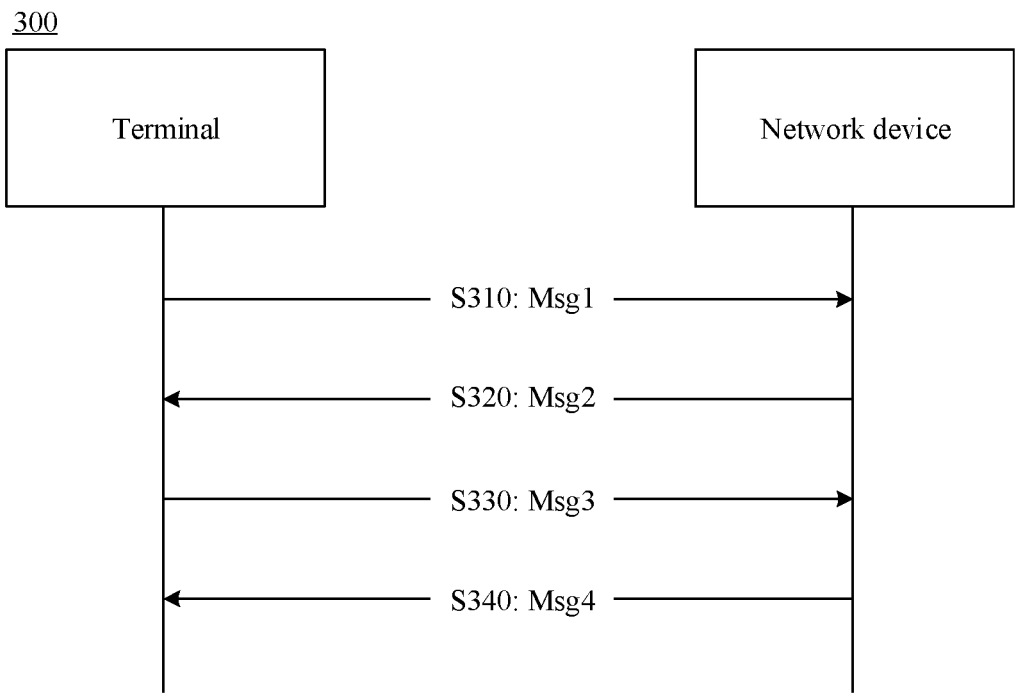
FIG. 5 is a schematic flowchart of completing random access by a terminal device and a network device in four operations.

FIG. 5 is a schematic flowchart of completing random access by a terminal and a network device in four operations. It should be understood that, in FIG. 5, contention-based random access (CBRA) is used as an example, and the process includes the following operations.

S310: The terminal sends a random access process message 1 (Msg1) to the network device.

It should be understood that the random access process message 1 (Msg1) may also be referred to as a random access request message or a random access preamble sequence (preamble).

A main function of the preamble is to notify the network device that there is a random access request, so that the network device can estimate a transmission latency between the network device and the terminal. This helps the network device calibrate uplink timing and notify the terminal of calibration information through a random access process message 2 (Msg2) in S320.

Each cell has 64 available preamble sequences, and the terminal may select a preamble for transmission on a physical random access channel (PRACH). The network device notifies, through a system message, the terminal of a time-frequency resource set of PRACHs that can be used to transmit the preamble in a current cell. When initiating random access, the terminal selects a PRACH resource, to send the preamble.

S320: The network device sends the random access process message 2 (Msg2) to the terminal.

It should be understood that the random access process message 2 (Msg2) may also be referred to as a random access response message.

Specifically, after receiving the preamble sent by the terminal, the network device sends a corresponding random access response (RAR) to the terminal. The corresponding random access response may include at least one of the following parameters: time and frequency domain information for transmitting a random access process message 3 (Msg3) in S330, a modulation and coding scheme used for the Msg3, a preamble identifier, timing advance (TA) information, and initial uplink grant (UL grant) information. In addition, identification information of the terminal may be further carried. For the CBRA, after receiving the Msg2, the terminal determines whether the preamble indicates by the preamble identifier in the Msg2 is the same as the preamble sent in S310. If the preamble indicates by the preamble identifier in the Msg2 is the same as the preamble sent in S310, it is considered that the Msg2 is successfully received; otherwise, it is considered that the Msg2 fails to be received, and the terminal may re-trigger a random access (RA) process.

S330: The terminal sends the random access process message 3 (Msg3) to the network device.

Specifically, the terminal sends data on a corresponding uplink transmission resource, through a physical uplink shared channel (PUSCH), based on the UL grant information indicated in the Msg2. The data may include a radio resource control (RRC) message and the identification information of the terminal, for example, C-RNTI information of the terminal, a resume identifier (Resume ID) of the terminal, or an inactive identifier (inactive RNTI, I-RNTI) of the terminal. The resume ID or the I-RNTI is allocated by the network device to the terminal, and the terminal reports the identifier to be used by the network device to identify an identity of the terminal and related configuration information, and the like.

S340: The network device sends a random access process message 4 (Msg4) to the terminal.

Specifically, because the terminal sends the identification information of the terminal in S330, in a contention resolution mechanism, the network device sends the identification information of the terminal through the Msg4 in S340, to specify a terminal that wins in contention resolution, and another terminal that does not win in contention resolution re-initiates random access.

Figure 6:
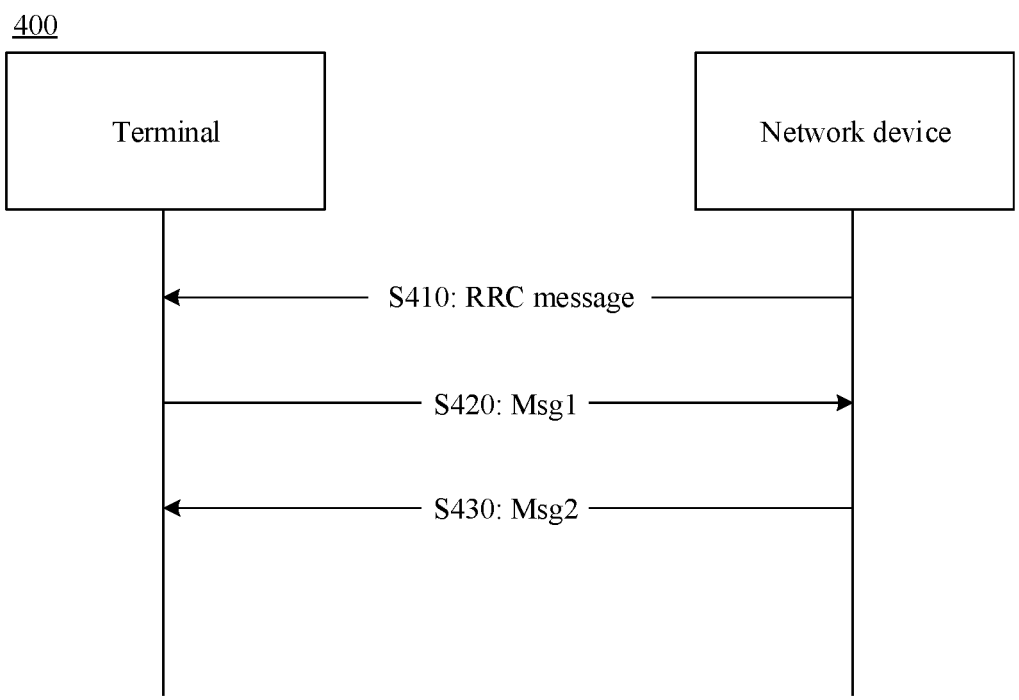
FIG. 6 is a schematic flowchart of completing random access by a terminal device and a network device in two operations.

FIG. 6 is a schematic flowchart of completing random access by a terminal and a network device in two operations, and the process includes the following operations.

S410: The network device sends an RRC message to the terminal.

It should be understood that the RRC message may be sent to the terminal in a broadcast manner (for example, a system message), or may be sent to the terminal through RRC dedicated signaling.

Specifically, the RRC message may include UL grant information, and may include time and frequency domain information for transmitting a random access process message 1 (Msg1) in S420, a modulation and coding scheme used for the Msg1, and the like.

S420: The terminal sends the random access process message 1 (Msg1) to the network device.

It should be understood that the random access process message 1 (Msg1) may also be referred to as a random access request message, and the message 1 (Msg1) may include at least one of the following signals:

(1) Preamble: In an embodiment, the network device may perform channel estimation based on the preamble, used for signal processing at a data receive end.

(2) Demodulation reference signal (DMRS): The demodulation reference signal is used for signal processing, such as data demodulation, at a related receive end.

The message 1 (Msg1) may further carry data, and the data includes at least one of the following types of data:

(1) User plane data: The user plane data includes to-be-sent data of a user. When at least one logical channel is configured for the terminal, the user plane data may include data of the at least one logical channel.

(2) RRC message: The RRC message includes identification information of the terminal, for example, C-RNTI information of the terminal, a resume identifier (Resume ID) of the terminal, or an inactive identifier (inactive RNTI, I-RNTI) of the terminal. The resume ID or the I-RNTI is allocated by the network device to the terminal, and the terminal reports the identifier to be used by the network device to identify an identity of the terminal and related configuration information, and the like.

Specifically, the terminal sends the data on a corresponding uplink transmission resource, through a physical layer channel, based on the UL grant information indicated in the RRC message in S410. The physical layer channel may be a PUSCH channel, or may be a contention-based physical layer channel different from the PUSCH. This is not limited herein.

S430: The network device sends a random access process message 2 (Msg2) to the terminal.

It should be understood that the random access process message 2 (Msg2) may also be referred to as a random access response message.

Specifically, after receiving the Msg1 sent by the terminal, the network device sends a corresponding random access response (RAR) to the terminal. In an embodiment, the network device may further send the RRC message. The RAR and the RRC message may include at least one of the following parameters: a preamble identifier, timing advance (TA) information, and uplink grant (UL grant) information. In addition, the identification information of the terminal may be further carried.

In an embodiment, if the Msg2 includes the preamble identifier, after receiving the Msg2, the terminal determines whether the preamble indicates by the preamble identifier in the Msg2 is the same as the preamble sent in S420. If the preamble indicates by the preamble identifier in the Msg2 is the same as the preamble sent in S420, it is considered that the Msg2 is successfully received; otherwise, it is considered that the Msg2 fails to be received, and the terminal may re-trigger an RA process.

In an embodiment, if the Msg2 includes a resume ID or an I-RNTI, after receiving the Msg2, the terminal determines whether the resume ID or the I-RNTI in the Msg2 is the same as the resume ID or the I-RNTI sent in S420. If the resume ID or the I-RNTI in the Msg2 is the same as the resume ID or the I-RNTI sent in S420, it is considered that the Msg1 is sent successfully.

It should be understood that a technical solution in an embodiment of this application may be applied to the random access process, or may be applied to a preconfigured resource scheduling process, or may be applied to another data transmission scenario. This is not limited in this application.

Figure 7:
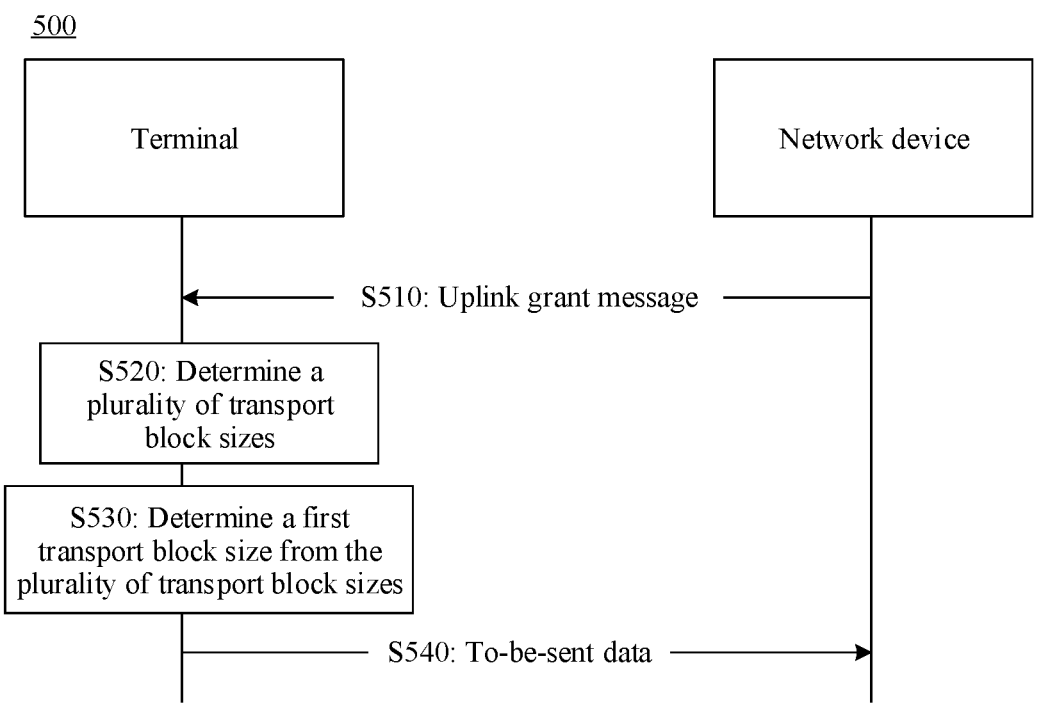
FIG. 7 is a schematic flowchart of a data transmission method according to an embodiment of this application.

FIG. 7 is a schematic flowchart of a data transmission method 500 according to an embodiment of this application. As shown in FIG. 7, an execution body of the method 500 may be a data transmission apparatus (for example, a terminal or a chip or an apparatus applied to a terminal). An example in which the execution body of the method 500 is the terminal is used below for description, and the method 500 includes the following operations.

S510: The terminal receives an uplink grant message from a network device, where the uplink grant message includes first information, and the first information corresponds to a plurality of transport block sizes.

It should be understood that the first information may be an information element supported in an existing protocol. For example, the first information includes a modulation and coding scheme (MCS), and the MCS corresponds to the plurality of transport block sizes.

It should be further understood that, in an embodiment of this application, that the first information corresponds to a plurality of transport block sizes may also be referred to as that there is a mapping relationship between the first information and the plurality of transport block sizes.

In an embodiment, the MCS is identified by an MCS index, and the plurality of transport block sizes are identified by transport block size indexes.

In this embodiment of this application, the information element supported in the existing protocol is used to establish a correspondence between the information element and a transport block size (TBS), thereby reducing air interface overheads.

It should be further understood that a new information element may be further added to the uplink grant message, and a correspondence between the newly added information element and the transport block size is established.

In an embodiment, the receiving, by the terminal, an uplink grant message from a network device includes:

The terminal receives a random access response from the network device, where the random access response includes the uplink grant message.

Specifically, the technical solution in this embodiment of this application may be applied to a random access process. The uplink grant message may be carried in operation S320 shown in FIG. 5 and sent by the network device to the terminal. The random access response includes the uplink grant message, where the uplink grant message includes the MCS, and the MCS corresponds to the plurality of transport block sizes.

In an embodiment, the receiving, by the terminal, an uplink grant message from a network device includes:

The terminal receives RRC signaling from the network device, where the RRC signaling includes the uplink grant message.

Specifically, the technical solution in this embodiment of this application may be applied to a random access process. The uplink grant message may be carried in operation S410 shown in FIG. 6 and sent by the network device to the terminal. The RRC signaling includes the uplink grant message, where the uplink grant message includes the MCS, and the MCS corresponds to the plurality of transport block sizes.

In an embodiment, the receiving, by the terminal, an uplink grant message from a network device includes:

The terminal receives RRC signaling from the network device, where the RRC signaling includes the uplink grant.

Alternatively, the terminal receives RRC signaling and downlink control information (DCI) from the network device, where the RRC signaling includes configuration information of the uplink grant message, and the DCI includes the uplink grant message.

Specifically, the technical solution in this embodiment of this application may be applied to a preconfigured resource scheduling process. The network device may send the RRC signaling to the terminal, where the RRC includes the MCS, and the MCS corresponds to the plurality of transport block sizes. Alternatively, the network device may send the RRC signaling and the downlink control information (DCI) to the terminal, where the DCI includes the MCS, and the MCS corresponds to the plurality of transport block sizes.

Table 1 shows a mapping relationship between an MCS index and a transport block size index.

TABLE 1

Mapping relationship between an MCS index and a transport block size index

| MCS index | Modulation order | TBS index |
|---|---|---|
| 0 | 1 | 0 |
|   | 1 | 2 |
|   | 1 | 1 |
| 1 | 2 | 3 |
|   | 2 | 4 |
|   | 2 | 5 |
| 2 | 2 | 6 |
|   | 2 | 7 |
|   | 2 | 8 |

Table 2 shows a mapping relationship between a transport block size index and a quantity of physical resource blocks.

TABLE 2

Mapping relationship between a transport block size index and a quantity of physical resource blocks

| TBS index | Quantity of physical resource blocks | | | | | | | | | |
|---|---|---|---|---|---|---|---|---|---|---|
|  | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |

For example, MCS index=0 corresponds to three TBS indexes, which respectively correspond to three different TBS sizes. As shown in Table 1, MCS index=0 corresponds to TBS index=0, TBS index=2, or TBS index=1, and when the quantity of physical resource blocks is 10, the TBS may be 256, 344, or 424.

It should be understood that in this embodiment of this application, a correspondence between the MCS index and the TBS index is not limited, and a correspondence between an index number of the TBS index and the TBS is not limited either. Table 1, Table 2, and Table 3 and Table 4 below are merely examples, and this application is not limited thereto.

Table 3 shows another mapping relationship between an MCS index and a transport block size index.

TABLE 3

Mapping relationship between an MCS index and a transport block size index

| MCS index | Modulation order | TBS index |
|---|---|---|
| 0 | 1 | 0 |
| 1 | 1 | 2 |
| 2 | 2 | 1 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |

Table 4 shows another mapping relationship between a transport block size index and a quantity of physical resource blocks.

TABLE 4

Mapping relationship between a transport block size
index and a quantity of physical resource blocks

| TBS index | Quantity of physical resource blocks | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| | 8 | 16 | 28 | 44 | 60 | 76 | 88 | 104 | 112 | 128 |
| | 4 | 8 | 14 | 22 | 30 | 32 | 44 | 52 | 56 | 64 |

For example, MCS index=0 corresponds to one TBS index, and for one specific quantity of physical resource blocks, the TBS index may correspond to three TBSs. As shown in Table 3, MSC index=0 corresponds to TBS index=0, and when TBS index=0 and the quantity of physical resource blocks is 10, the TBS may be 256, 128, or 64.

In the current technology, a mapping relationship between an MCS index and a transport block size index and a mapping relationship between the transport block size index and a quantity of physical resource blocks may be respectively shown in Table 3 and Table 2. Through an MCS index, a corresponding TBS index may be obtained, and for one specific quantity of physical resource blocks, the TBS index corresponds to one specific value of a TBS. For example, when TBS index=0, and the quantity of physical resource blocks is 10, the TBS is 256 bits.

According to the transmission method in this embodiment of this application, a correspondence between the MCS index and the plurality of transport block sizes is established. This helps improve flexibility of uplink transmission, thereby improving air interface resource utilization and data transmission reliability.

S520: The terminal determines the plurality of transport block sizes based on the first information.

Specifically, after receiving the uplink grant message, the terminal determines the plurality of transport block sizes based on the first information in the uplink grant message.

In an embodiment, the determining, by the terminal, the plurality of transport block sizes based on the first information includes:

The terminal determines the plurality of transport block sizes based on a preset correspondence between the first information and the plurality of transport block sizes.

Specifically, the terminal presets a correspondence between the first information and the plurality of transport block sizes. When receiving the uplink grant message, the terminal may determine the plurality of transport block sizes based on the preset correspondence.

In an embodiment, the method 500 further includes:

The network device sends the correspondence between the first information and the plurality of transport block sizes to the terminal, and the terminal receives the correspondence, sent by the network device, between the first information and the plurality of transport block sizes.

In an embodiment, the correspondence between the first information and the plurality of transport block sizes is carried in the RRC message or system information sent by the network device to the terminal.

Specifically, the terminal may obtain the correspondence between the first information and the plurality of transport block sizes from the network device in advance, so that when receiving the uplink grant message, the terminal may determine the plurality of transport block sizes by obtaining the correspondence from the network device.

In an embodiment, after receiving the uplink grant message at a second protocol layer, the terminal determines the plurality of transport block sizes corresponding to the first information, and may transfer information about the determined plurality of transport block sizes to a first protocol layer.

In an embodiment, the first protocol layer is a media access control layer.

In an embodiment, the second protocol layer is a physical layer.

It should be understood that the correspondence between the first information and the plurality of transport block sizes may also be predefined in a protocol.

S530: The terminal determines, based on a size of to-be-sent data, a first transport block size from the plurality of transport block sizes.

In an embodiment, the determining, by the terminal based on a size of to-be-sent data, a first transport block size from the plurality of transport block sizes includes:

The terminal determines, at the first protocol layer based on the size of the to-be-sent data, the first transport block size from the plurality of transport block sizes.

In an embodiment, the first protocol layer is a media access control layer.

Specifically, the terminal selects, at the MAC layer based on the size of the to-be-sent data, an appropriate transport block size (the first transport block size) from the plurality of transport block sizes.

In an embodiment, the determining, by the terminal based on a size of to-be-sent data, a first transport block size from the plurality of transport block sizes includes:

The terminal determines, at the first protocol layer, the size of the to-be-sent data.

The terminal determines, at the second protocol layer based on the size of the to-be-sent data, the first transport block size from the plurality of transport block sizes.

In an embodiment, the first protocol layer is a media access control layer, and the second protocol layer is a physical layer.

In an embodiment, the terminal may segment the to-be-sent data at the MAC layer or a radio link control (RLC) layer. To be specific, when a MAC SDU or an RLC SDU cannot be completely placed into a resource corresponding to the UL grant because a size exceeds a TBS size of the UL grant, the MAC SDU or the RLC SDU may be divided into at least one segment, and a size of the segment may meet the TBS size of the UL grant, so as to send the data.

Specifically, the terminal determines the size of the to-be-sent data at the MAC layer, and notifies the physical layer of the size of the to-be-sent data. The physical layer selects, based on the size of the to-be-sent data, an appropriate transport block size (the first transport block size) from the plurality of transport block sizes.

In an embodiment, the method 500 further includes:

The terminal determines a repetition quantity of the to-be-sent data based on the first transport block size.

In an embodiment, the terminal determines, at the first protocol layer, the repetition quantity of the to-be-sent data.

In an embodiment, the terminal determines, at the second protocol layer, the repetition quantity of the to-be-sent data.

For example, when the TBS is 256, 128, or 64, and an amount of the to-be-sent data of the terminal is between 128 and 256, the terminal determines that the repetition quantity is 1, and performs packet assembly based on that the TBS is 256.

For another example, when the TBS is 256, 128, or 64, and an amount of the to-be-sent data of the terminal is between 64 and 128, the terminal determines that the repetition quantity is 2, and performs packet assembly based on that the TBS is 128.

For still another example, when the TBS is 256, 128, or 64, and an amount of the to-be-sent data of the terminal is less than 64, the terminal determines that the repetition quantity is 4, and performs packet assembly based on that the TBS is 64.

In an embodiment, the to-be-sent data may include control plane signaling, for example, an RRC message, and the RRC message includes an RRC connection setup request, an RRC resume request, or the like.

In an embodiment, the to-be-sent data may include control plane signaling, for example, a cell radio network temporary identifier (C-RNTI).

In an embodiment, the to-be-sent data may include user plane data.

In an embodiment, segmentation processing may be performed on the user plane data. To be specific, the terminal may segment, based on the first transport block size, an upper-layer data packet into a plurality of data packets, and transfer the segmented data packets to a lower-layer protocol stack (for example, the MAC layer).

Further, the size of the to-be-sent data may be an amount of data including a MAC subheader.

Further, the size of the to-be-sent data may be a sum of amounts of data corresponding to all logical channels of the terminal.

S540: The terminal sends the to-be-sent data to the network device based on the first transport block size.

In an embodiment, when the size of the to-be-sent data is less than or equal to half of a size of an uplink resource, the sending, by the terminal, the to-be-sent data to the network device based on the first transport block size includes:

The terminal sends, on the uplink resource granted by the uplink grant message, the to-be-sent data to the network device for the repetition quantity of times by using the first transport block size.

For example, when the TBS is 256, 128, or 64, and an amount of the to-be-sent data of the terminal is between 64 and 128, the terminal determines that the repetition quantity is 2, and performs packet assembly on the to-be-sent data based on that the TBS is 128. The terminal may send the to-be-sent data to the network device twice.

In an embodiment, the determining, by the terminal, a repetition quantity of the to-be-sent data based on the first transport block size includes:

The terminal determines, based on the first transport block size and a preset correspondence between a transport block size and a repetition quantity, that a repetition quantity corresponding to the first transport block size is the repetition quantity of the to-be-sent data.

Specifically, the correspondence between the transport block size and the repetition quantity is preset in the terminal. After determining the first transport block size, the terminal may determine the repetition quantity of the to-be-sent data based on the preset correspondence.

In an embodiment, the method 500 further includes:

The network device sends the correspondence between the transport block size and the repetition quantity to the terminal, and the terminal receives, from the network device, the correspondence between the transport block size and the repetition quantity.

The determining, by the terminal, a repetition quantity of the to-be-sent data based on the first transport block size includes:

The terminal determines, based on the first transport block size and the correspondence that is received from the network device and that is between the transport block size and the repetition quantity, that the repetition quantity corresponding to the first transport block size is the repetition quantity of the to-be-sent data.

In an embodiment, the correspondence between the transport block size and the repetition quantity may be carried in the RRC message or the system information sent by the network device to the terminal.

Specifically, the terminal may receive the correspondence between the transport block size and the repetition quantity from the network device in advance. When determining the first transport block size, the terminal may determine the repetition quantity based on the correspondence received from the network device, and send the to-be-sent data to the network device for the repetition quantity of times.

In an embodiment, the correspondence between the transport block size and the repetition quantity may be predefined in the protocol.

It should be understood that in an embodiment of this application, the correspondence between the transport block size and the repetition quantity may also be referred to as a mapping relationship between the transport block size and the repetition quantity.

Before a specific packet assembly and data transmission manner in the embodiments of this application is described, two formats of a media access control layer protocol data unit (MAC PDU) are first described.

Format 1

Figure 8:
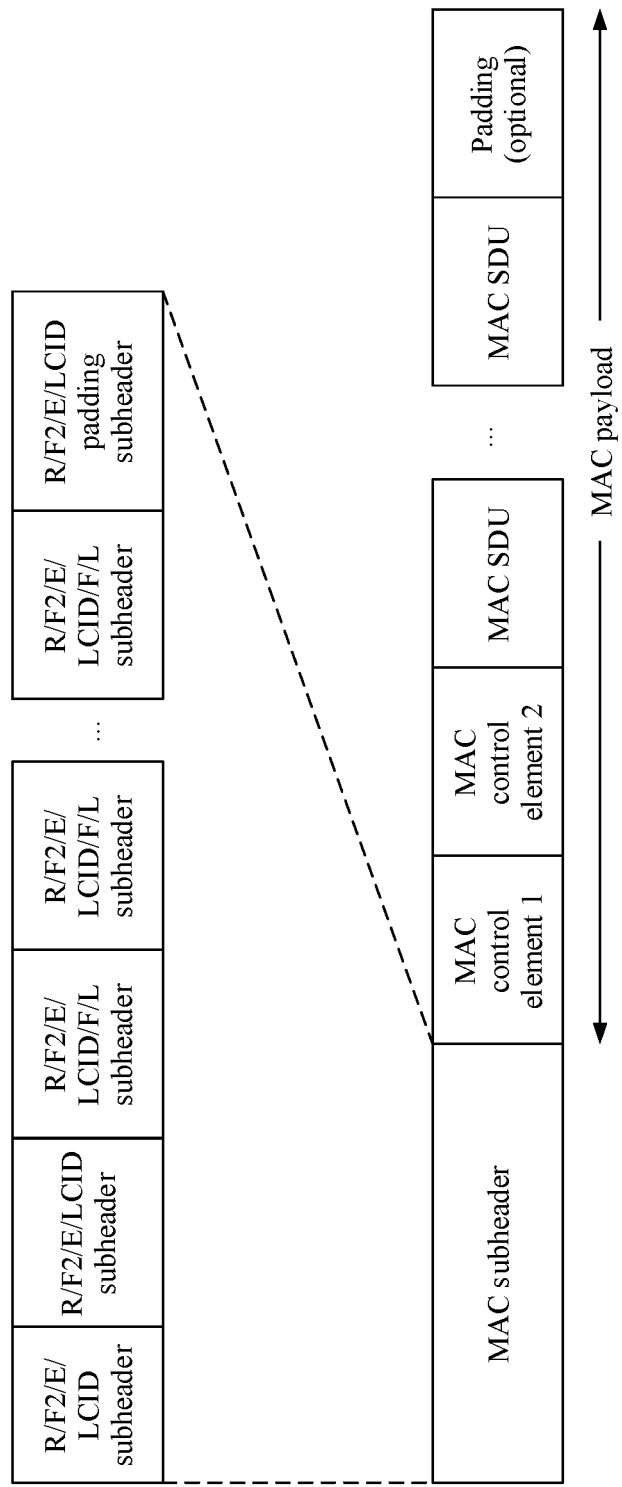
FIG. 8 is a schematic diagram of a format of a MAC PDU.

FIG. 8 shows a format of a MAC PDU. As shown in FIG. 8, the MAC PDU may include two parts: a MAC subheader and a MAC payload. The MAC payload may be a media access control layer service data unit (MAC SDU), a media access control layer control element (MAC CE), or padding.

Format 2

Figure 9:
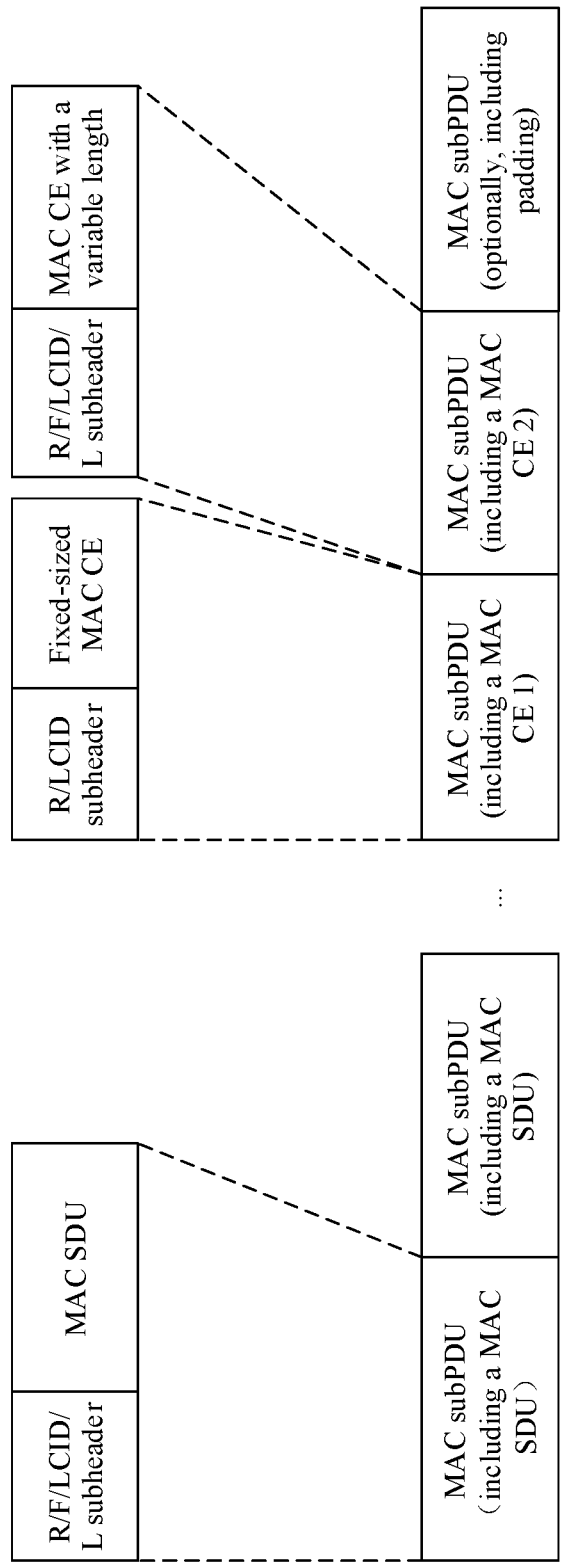
FIG. 9 is a schematic diagram of another format of a MAC PDU.

FIG. 9 shows another format of a MAC PDU. As shown in FIG. 9, the MAC PDU may include one or more media access control layer sub-protocol data units (MAC subPDU), where the MAC subPDU may include a MAC subheader, and may further include a MAC payload. The MAC payload may be a MAC SDU, a MAC CE, or padding, where one MAC SDU, one MAC CE, or padding is distributed, in a form of the MAC subPDU, in the MAC PDU in an overlapping manner.

The following describes several specific packet assembly and data transmission manners of the terminal.

Manner 1

The terminal forms, at the first protocol layer based on the first transport block size, the to-be-sent data into a first protocol layer protocol data unit, and indicates new transmission of a hybrid automatic repeat request (HARQ) process corresponding to the first protocol layer protocol data unit.

The terminal indicates, at the first protocol layer, repetition transmission of the first protocol layer protocol data unit in the HARQ process.

In an embodiment, the first protocol layer is a media access control layer.

Specifically, the terminal may perform packet assembly at the MAC layer, form the to-be-sent data into the MAC PDU based on the first transport block size, and store the MAC PDU in a buffer corresponding to the HARQ process to wait for sending, that is, initial transmission of the to-be-sent data. The terminal triggers, at the MAC layer, new transmission of the HARQ process, and indicates the physical layer to perform new transmission. Subsequently, the terminal triggers, at the MAC layer, repetition transmission of the HARQ process, and indicates the physical layer to perform repetition transmission.

It should be understood that, in an embodiment of this application, that the terminal triggers, at the MAC layer, repetition transmission of the HARQ process may also be referred to as triggering retransmission of the HARQ process. The retransmission of the HARQ process is non-adaptive retransmission, and the repetition transmission of the HARQ process may be performed without receiving feedback data of the HARQ process.

It should be further understood that, in an embodiment of this application, a quantity of times of repetition transmission of the HARQ process is the repetition quantity-1.

In an embodiment, the HARQ process may be 0, or the HARQ process is predefined in the protocol, or the HARQ process is indicated by the network device, or the HARQ process is obtained by the terminal through calculation based on configuration information of the network device.

Figure 10:
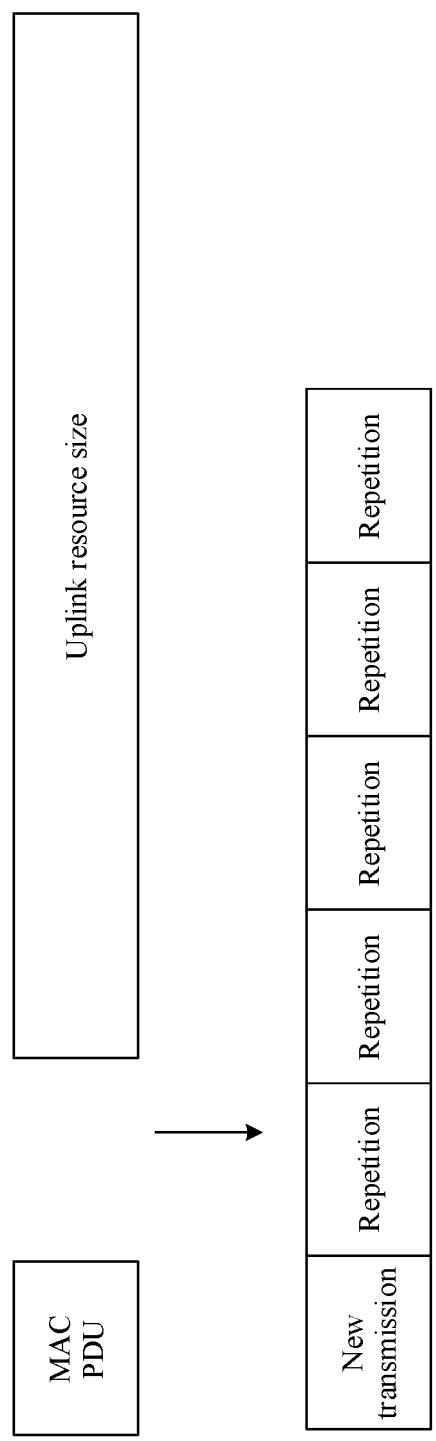
FIG. 10 is a schematic diagram of data repetition transmission.

FIG. 10 is a schematic diagram of repetition transmission of data. As shown in FIG. 10, the terminal determines that the repetition quantity is 6, and after initial transmission (or new transmission), the terminal further needs to perform repetition transmission for five times.

It should be understood that Manner 1 may be applicable to the MAC PDU formats shown in FIG. 8 and FIG. 9.

According to the data transmission method in this embodiment of this application, the to-be-sent data is repeatedly sent for a plurality of times when the uplink grant allows. This helps increase a soft combination gain. After the terminal repeatedly sends data for a plurality of times, a success rate of decoding the data by the network device is increased, thereby improving air interface resource utilization and transmission reliability.

Manner 2

The terminal forms, at the first protocol layer, the to-be-sent data into a first protocol layer payload for the repetition quantity of times.

The terminal forms the first protocol layer payload into a first protocol layer protocol data unit, and indicates new transmission of a HARQ process corresponding to the first protocol layer protocol data unit.

In an embodiment, the HARQ process may be 0, or the HARQ process is predefined in the protocol, or the HARQ process is indicated by the network device, or the HARQ process is obtained by the terminal through calculation based on configuration information of the network device.

In an embodiment, the terminal first performs packet assembly at the first protocol layer, forms the first protocol layer protocol data unit based on the first transport block size, and stores the MAC PDU in a buffer corresponding to the HARQ process to wait for sending.

In an embodiment, the first protocol layer payload of the first protocol layer protocol data unit includes at least one first protocol layer control element and/or at least one first protocol layer service data unit, and the first protocol layer control element and/or the first protocol layer service data unit may repeatedly fill the first protocol layer protocol data unit.

For example, the terminal forms, at the MAC layer based on the first transport block size, the to-be-sent data into a MAC PDU, and the MAC PDU includes a MAC subheader and a MAC payload (the MAC payload may include at least one of a MAC CE, a MAC SDU, or padding). If the terminal determines that the repetition quantity of the to-be-sent data is 6, the terminal may repeatedly fill the MAC PDU with the MAC payload. Finally, the MAC PDU includes a MAC subheader and six MAC payloads.

In an embodiment, the frontmost part of the MAC PDU is filled with the MAC subheader.

Figure 11:
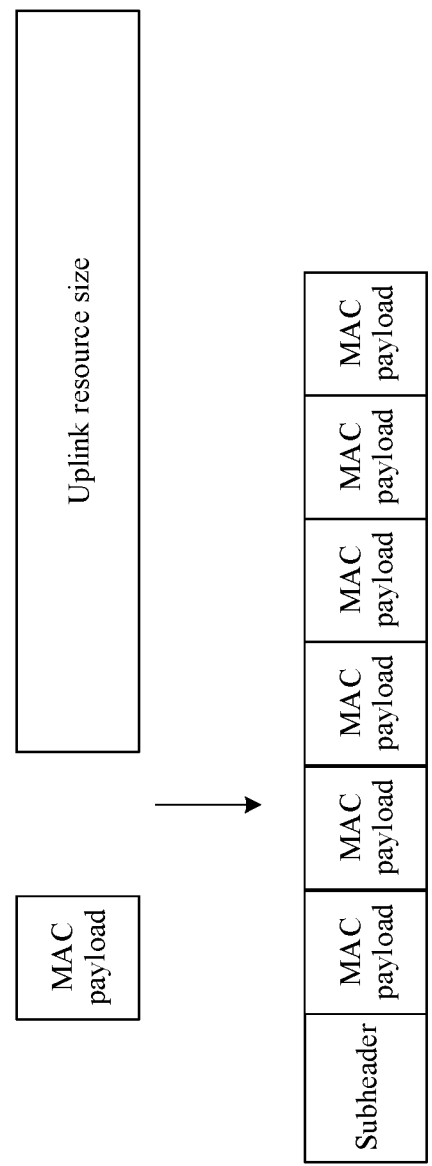
FIG. 11 is a schematic diagram of another data repetition transmission.

FIG. 11 is a schematic diagram of another repetition transmission of data. As shown in FIG. 11, in the current technology, the terminal may form, at the MAC layer, the to-be-sent data into a MAC PDU including a MAC subheader and a MAC payload. However, in this embodiment of this application, the terminal determines that the repetition quantity is 6. At the MAC layer, the to-be-sent data is formed into a MAC PDU including the MAC subheader and six MAC payloads (the MAC payload is repeated for five times). The terminal performs new transmission only once, and the newly transmitted MAC PDU includes a MAC subheader and six MAC payloads.

It should be understood that Manner 2 may be applicable to the MAC PDU format shown in FIG. 8.

According to the data transmission method in this embodiment of this application, the to-be-sent data is repeatedly sent for a plurality of times when the uplink grant allows, and a plurality of repeated control elements or service data units form a large protocol data unit. This helps improve air interface resource utilization and transmission reliability.

Manner 3

The terminal forms, at the first protocol layer, the to-be-sent data into a first protocol layer sub-protocol data unit for the repetition quantity of times.

The terminal forms the first protocol layer sub-protocol data unit into a first protocol layer protocol data unit, and indicates new transmission of a HARQ process corresponding to the first protocol layer protocol data unit.

In an embodiment, the HARQ process may be 0, or the HARQ process is predefined in the protocol, or the HARQ process is indicated by the network device, or the HARQ process is obtained by the terminal through calculation based on configuration information from the network device.

In an embodiment, a subheader of the first protocol layer sub-protocol data unit includes an indication information element, and the indication information element is used to indicate whether the first protocol layer sub-protocol data unit is a repeated protocol data unit.

In an embodiment, the MAC PDU includes one or more MAC subPDUs, and the MAC subPDU may repeatedly filled in the MAC PDU.

In an embodiment, a subheader of each of the one or more MAC subPDUs may indicate that a subsequent MAC subPDU is a repetition of a current MAC subPDU or is a new MAC subPDU.

In an embodiment, a subheader of each of the one or more MAC subPDUs may indicate that a current MAC subPDU is a repetition of a previous MAC subPDU or is a new MAC subPDU.

In an embodiment, a reserved bit (R bit) of a subheader of each MAC subPDU is used to indicate that a subsequent MAC subPDU is a repetition of a current MAC subPDU or is a new MAC subPDU; or indicate that a current MAC subPDU is a repetition of a previous MAC subPDU or is a new MAC subPDU.

For example, when R is 1, the subheader of the MAC subPDU indicates that the subsequent MAC subPDU is a repetition of the MAC subPDU.

It should be understood that, if the MAC PDU includes a plurality of MAC subPDUs, R in a subheader of a last MAC subPDU in the plurality of MAC subPDUs may be 0, and R in a subheader of a MAC subPDU other than the last MAC subPDU may be 1.

For another example, when R is 1, it indicates that the current MAC subPDU is a repetition of the previous MAC subPDU.

It should be understood that, if the MAC PDU includes a plurality of MAC subPDUs, R in a subheader of a first MAC subPDU in the plurality of MAC subPDUs may be 0, and R in a subheader of a MAC subPDU other than the first MAC subPDU may be 1.

For example, the terminal forms, at the MAC layer based on the first transport block size, the to-be-sent data into a MAC PDU, and the MAC PDU includes one MAC subPDU. If the terminal determines that the repetition quantity of the to-be-sent data is 6, the terminal may repeatedly filled the MAC PDU with the MAC subPDU. Finally, the MAC PDU includes six MAC subPDUs.

Figure 12:
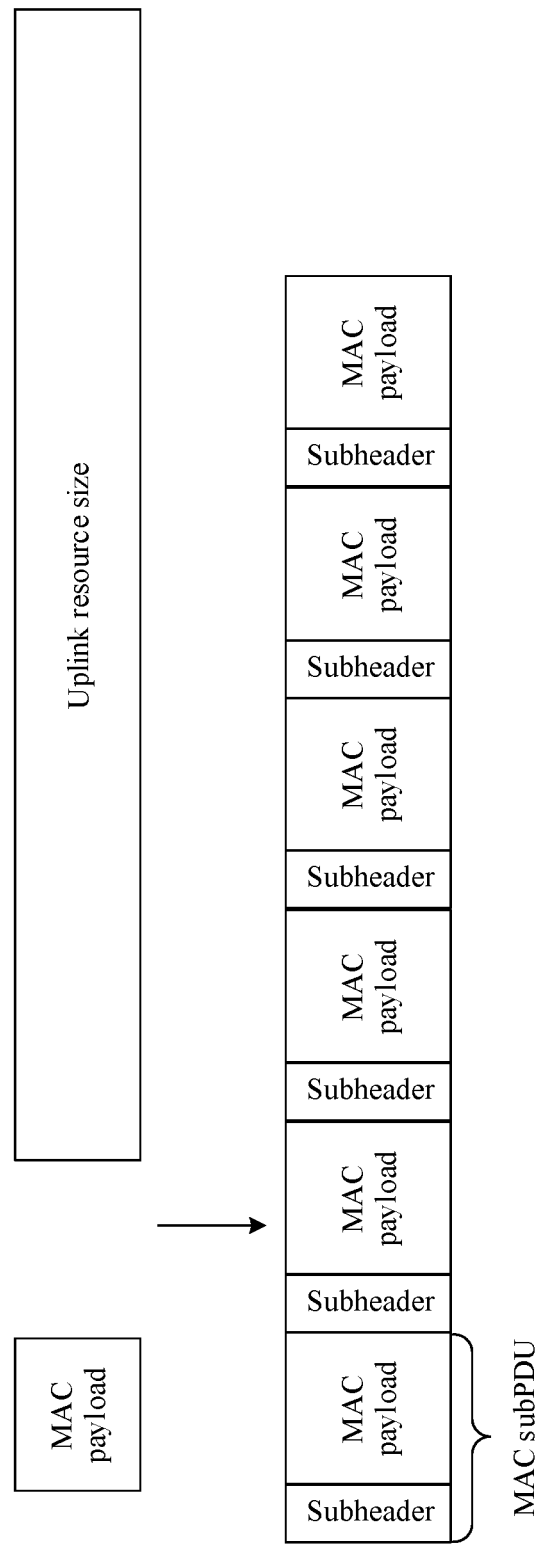
FIG. 12 is a schematic diagram of still another data repetition transmission.

FIG. 12 is a schematic diagram of still another repetition transmission of data. As shown in FIG. 12, in the current technology, the terminal may form, at the MAC layer, the to-be-sent data into a MAC PDU including a MAC subPDU. However, in this embodiment of this application, the terminal determines that the repetition quantity is 6. At the MAC layer, the to-be-sent data is formed into a MAC PDU including six MAC subPDUs (the MAC subPDU is repeated for five times). The terminal performs new transmission only once, and the newly transmitted MAC PDU includes six MAC subPDUs.

It should be understood that Manner 3 may be applicable to the MAC PDU format shown in FIG. 9.

According to the transmission method in this embodiment of this application, the to-be-sent data is repeatedly sent for a plurality of times when the uplink grant allows, and a plurality of repeated sub-protocol data units form a large protocol data unit. This helps improve air interface resource utilization and transmission reliability. In addition, the subheader may indicate whether the sub-protocol data unit is a repeated sub-protocol data unit, to facilitate decoding on a network device side.

In an embodiment, the method 500 further includes:

The network device sends indication information to the terminal if the data fails to be received, where the indication information is used to indicate the terminal to repeatedly send the data.

Specifically, when the network device determines that the to-be-sent data of the terminal is not successfully decoded, that is, the to-be-sent data fails to be transmitted, the network device may indicate the terminal to retransmit the to-be-sent data, and the network device may include the indication information in an uplink grant message for retransmission. The indication information is used to indicate to repeatedly send the to-be-sent data, that is, indicate the terminal to repeatedly send the to-be-sent data in the manner in S540.

In an embodiment, the method 500 further includes:

The network device sends indication information to the terminal if the data fails to be received, where the indication information is used to indicate a first uplink grant resource, and the first uplink grant resource is used to send the to-be-sent data once.

Specifically, when the network device determines that the to-be-sent data of the terminal is not successfully decoded, that is, the to-be-sent data fails to be transmitted, the network device may indicate the terminal to retransmit the to-be-sent data. In this case, because the network device already knows the size of the to-be-sent data, the network device may determine an appropriate uplink resource (for example, the uplink resource enables the terminal to perform packet assembly in a normal packet assembly manner and transmit the MAC PDU only once) based on the size of the to-be-sent data, and indicate the uplink resource in an uplink grant message for retransmission. After receiving the uplink grant message for retransmission, the terminal may transmit the MAC PDU once on the uplink resource indicated by the uplink grant message.

The foregoing describes in detail the data transmission method according to the embodiments of this application with reference to FIG. 1 to FIG. 12. The following describes in detail the data transmission apparatus, the terminal, and the network device according to the embodiments of this application with reference to FIG. 13 to FIG. 16.

An embodiment of this application further provides an apparatus configured to implement any one of the foregoing methods. For example, an apparatus is provided, including units (or means) configured to implement the operations performed by the terminal in any one of the foregoing methods. For another example, another apparatus is further provided, including units (or means) configured to implement the operations performed by the network device in any one of the foregoing methods.

Figure 13:
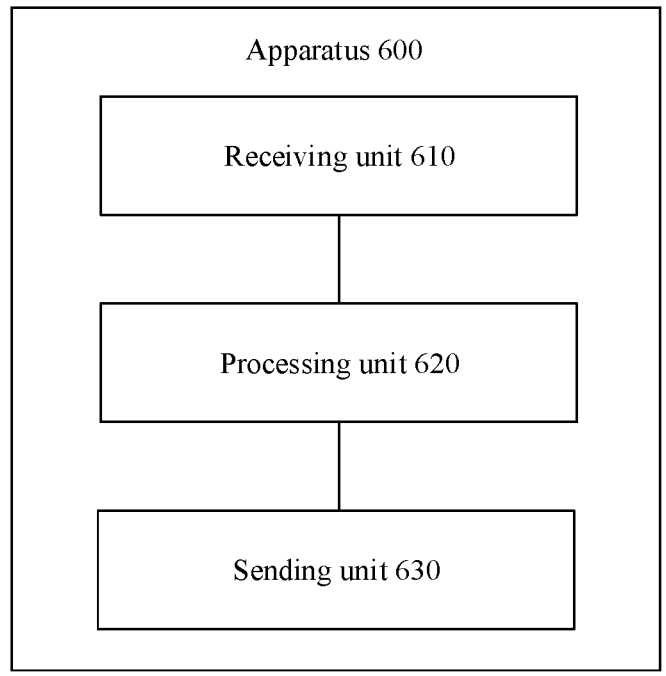
FIG. 13 is a schematic block diagram of a data transmission apparatus according to an embodiment of this application.

FIG. 13 is a schematic block diagram of a data transmission apparatus 600 according to an embodiment of this application. As shown in FIG. 13, the data transmission apparatus 600 may include a receiving unit 610, a processing unit 620, and a sending unit 630.

In an embodiment, the data transmission apparatus may be the terminal in the method 300, the method 400, or the method 500, or may be a chip configured in the terminal.

Specifically, the receiving unit 610 is configured to receive an uplink grant message from a network device, where the uplink grant message includes first information, and the first information corresponds to a plurality of transport block sizes.

The processing unit 620 is configured to determine the plurality of transport block sizes based on the first information.

The processing unit 620 is further configured to determine, based on a size of to-be-sent data, a first transport block size from the plurality of transport block sizes.

The processing unit 620 is further configured to control, based on the first transport block size, the sending unit 430 to send the to-be-sent data to the network device.

In an embodiment, the to-be-sent data may include control plane signaling.

In an embodiment, the control plane signaling is an RRC message, and the RRC message includes an RRC connection setup request, an RRC resume request, or the like.

In an embodiment, the to-be-sent data may include control plane signaling.

In an embodiment, the control plane signaling is a cell radio network temporary identifier (C-RNTI).

In an embodiment, the to-be-sent data may include user plane data.

In an embodiment, the first information includes a modulation and coding scheme index, and the modulation and coding scheme index corresponds to the plurality of transport block sizes.

In an embodiment, the first information is a newly added information element in the uplink grant message, and the newly added information element corresponds to the plurality of transport block sizes.

In an embodiment, the processing unit 620 is specifically configured to:

determine the plurality of transport block sizes based on a preset correspondence between the first information and the plurality of transport block sizes.

In an embodiment, the receiving unit 610 is further configured to:

receive, from the network device, a correspondence between the first information and the plurality of transport block sizes.

In addition, the processing unit 620 is specifically configured to:

determine the plurality of transport block sizes based on the correspondence between the first information and the plurality of transport block sizes.

In an embodiment, the correspondence between the first information and the plurality of transport block sizes is predefined in a protocol.

In an embodiment, the plurality of transport block sizes are identified by transport block size indexes.

In an embodiment, the processing unit 620 is specifically configured to:

determine a repetition quantity of the to-be-sent data based on the first transport block size; and control the sending unit 630 to send the to-be-sent data to the network device for the repetition quantity of times on an uplink resource granted by the uplink grant message and by using the first transport block size.

In an embodiment, when the size of the to-be-sent data is less than half of a size of the uplink resource, the terminal repeatedly sends the to-be-sent data to the network device by using the first transport block size.

In an embodiment, when the first transport block size is greater than or equal to one third of the uplink resource and less than or equal to half of the uplink resource, the repetition quantity is 2.

In an embodiment, when the first transport block size is greater than or equal to one fourth of the uplink resource and less than or equal to one third of the uplink resource, the repetition quantity is 3.

In an embodiment, the processing unit 620 is specifically configured to:

determine, based on the first transport block size and a correspondence between a transport block size and a repetition quantity, that a repetition quantity corresponding to the first transport block size is the repetition quantity of the to-be-sent data.

In an embodiment, the correspondence between the transport block size and the repetition quantity is preset or is from the network device.

In an embodiment, the correspondence between the transport block size and the repetition quantity is predefined in the protocol.

In an embodiment, the processing unit 620 is specifically configured to:

form, at a first protocol layer based on the first transport block size, the to-be-sent data into a first protocol layer protocol data unit, and indicate new transmission of a hybrid automatic repeat request (HARQ) process corresponding to the first protocol layer protocol data unit; and indicate, at the first protocol layer, repetition transmission of the first protocol layer protocol data unit in the HARQ process.

In an embodiment, the HARQ process is a process 0.

In an embodiment, the HARQ process is predefined in the protocol.

In an embodiment, the HARQ process is indicated by the network device.

In an embodiment, the HARQ process is obtained by the terminal through calculation based on configuration information from the network device.

In an embodiment, the first protocol layer is a media access control layer.

In an embodiment, the second protocol layer is a physical layer.

In an embodiment, the first protocol layer protocol data unit is a media access control layer protocol data unit (MAC PDU).

In an embodiment, the processing unit 620 is specifically configured to:

form, at a first protocol layer, the to-be-sent data into a first protocol layer payload for the repetition quantity of times; and form the first protocol layer payload into a first protocol layer protocol data unit, and indicate new transmission of a HARQ process corresponding to the first protocol layer protocol data unit.

In an embodiment, the first protocol layer payload is a media access control layer payload (MAC payload).

In an embodiment, the first protocol layer protocol data unit is a media access control layer protocol data unit (MAC PDU).

In an embodiment, the first protocol layer protocol data unit includes at least one first protocol layer control element and/or at least one first protocol layer service data unit.

In an embodiment, the MAC PDU includes at least one MAC payload and/or at least one media access control layer service data unit (MAC SDU).

In an embodiment, the processing unit 620 is specifically configured to:

form, at a first protocol layer, the to-be-sent data into a first protocol layer sub-protocol data unit for the repetition quantity of times; and form the first protocol layer sub-protocol data unit into a first protocol layer protocol data unit, and indicate new transmission of a HARQ process corresponding to the first protocol layer protocol data unit.

In an embodiment, the first protocol layer sub-protocol data unit is a media access control layer sub-protocol data unit (MAC subPDU).

In an embodiment, the first protocol layer protocol data unit is a media access control layer protocol data unit (MAC PDU).

In an embodiment, a subheader of the first protocol layer sub-protocol data unit includes an indication information element, and the indication information element is used to indicate whether the first protocol layer sub-protocol data unit is a repeated protocol data unit.

In an embodiment, the processing unit 620 is specifically configured to:

determine, at the first protocol layer based on the size of the to-be-sent data, the first transport block size from the plurality of transport block sizes.

In an embodiment, the processing unit 620 is specifically configured to:

determine, at the first protocol layer, the size of the to-be-sent data; and determine, at a second protocol layer based on the size of the to-be-sent data, the first transport block size from the plurality of transport block sizes.

In an embodiment, the receiving unit 610 is specifically configured to:

receive a random access response sent by the network device in a random access process, where the random access response includes the uplink grant message.

The processing unit 620 is specifically configured to:

control, based on the first transport block size, the sending unit 620 to send a random access process message 3 to the network device, where the random access process message 3 includes the to-be-sent data.

In an embodiment, the receiving unit 610 is specifically configured to:

receive radio resource control (RRC) signaling sent by the network device, where the RRC signaling includes the uplink grant message.

The processing unit 620 is specifically configured to:

send a random access process message 1 to the network device based on the first transport block size, where the random access process message 1 includes the to-be-sent data.

In an embodiment, the receiving unit 610 is specifically configured to:

receive radio resource control (RRC) signaling from the network device, where the RRC signaling includes the uplink grant message; or receive RRC signaling and downlink control information (DCI) from the network device, where the RRC signaling includes configuration information of the uplink grant message, and the DCI includes the uplink grant message.

It should be understood that the data transmission apparatus 600 may correspond to the terminal in the data transmission method 500 according to the embodiments of this application, and the data transmission apparatus 600 may include units configured to perform the method performed by the terminal in the data transmission method 500 in FIG. 7. In addition, the units in the data transmission apparatus 600 and the foregoing other operations and/or functions are separately used to implement corresponding procedures of the data transmission method 500 in FIG. 7. For a specific process of performing the foregoing corresponding operations by the units, refer to the foregoing descriptions with reference to the method embodiment in FIG. 7. For brevity, details are not described herein.

Figure 14:
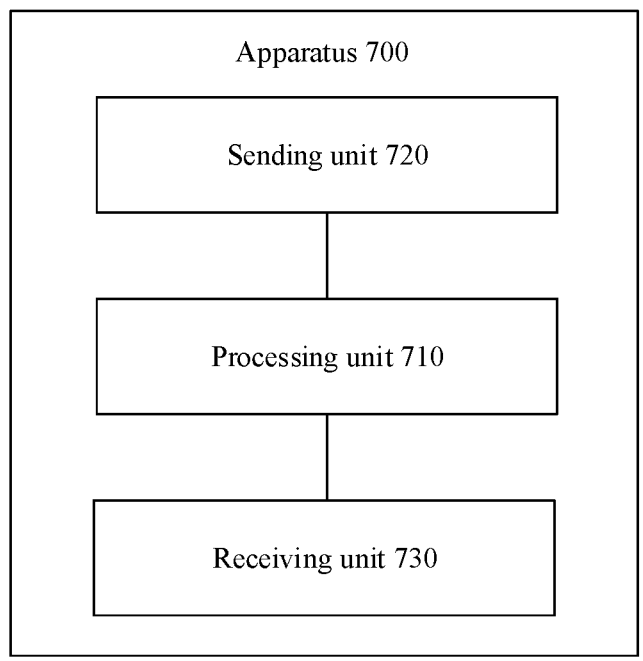
FIG. 14 is another schematic block diagram of a data transmission apparatus according to an embodiment of this application.

FIG. 14 is a schematic block diagram of a data transmission apparatus 700 according to an embodiment of this application. As shown in FIG. 14, the data transmission apparatus 700 may include a processing unit 710, a sending unit 720, and a receiving unit 730.

In an embodiment, the data transmission apparatus may be the network device in the method 300, the method 400, or the method 500, or may be a chip configured in the network device.

Specifically, the processing unit 710 is configured to generate an uplink grant message, where the uplink grant message includes first information, and the first information corresponds to a plurality of transport block sizes.

The sending unit 720 is configured to send the uplink grant message to a terminal.

The receiving unit 730 is configured to receive data sent by the terminal based on a first transport block size, where the plurality of transport block sizes include the first transport block size.

In an embodiment, the sending unit 720 is further configured to:

send a correspondence between the first information and the plurality of transport block sizes to the terminal.

In an embodiment, the sending unit 720 is further configured to:

send a correspondence between a transport block size and a repetition quantity to the terminal.

In an embodiment, the sending unit 720 is further configured to:

send indication information to the terminal if the data fails to be received, where the indication information is used to indicate the terminal to repeatedly send the data.

In an embodiment, the processing unit 710 is further configured to:

control the sending unit 730 to send indication information to the terminal if the data fails to be received, where the indication information is used to indicate a first uplink grant resource, and the first uplink grant resource is used to send the data once.

It should be understood that the data transmission apparatus 700 may correspond to the network device in the data transmission method 500 according to the embodiments of this application, and the data transmission apparatus 700 may include units configured to perform the method performed by the network device in the data transmission method 500 in FIG. 7. In addition, the units in the data transmission apparatus 700 and the foregoing other operations and/or functions are separately used to implement corresponding procedures of the data transmission method 500 in FIG. 7. For a specific process of performing the foregoing corresponding operations by the units, refer to the foregoing descriptions with reference to the method embodiment in FIG. 7. For brevity, details are not described herein.

It should be further understood that division into the units in the apparatuses is merely logical function division. In an embodiment, all or some of the units may be integrated into one physical entity, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, some or all of the units may be integrated together, or the units may be implemented independently. The processing element herein may also be referred to as a processor, and may be an integrated circuit having a signal processing capability. In an embodiment, the operations in the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more specific integrated circuits (ASIC), one or more microprocessors (digital signal processor, DSP), one or more field programmable gate arrays (FPGA), or a combination of at least two of the integrated circuits. For another example, when the unit in the apparatus is implemented by scheduling a program by a processing element, the processing element may be a general purpose processor, for example, a central processing unit (CPU) or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 15:
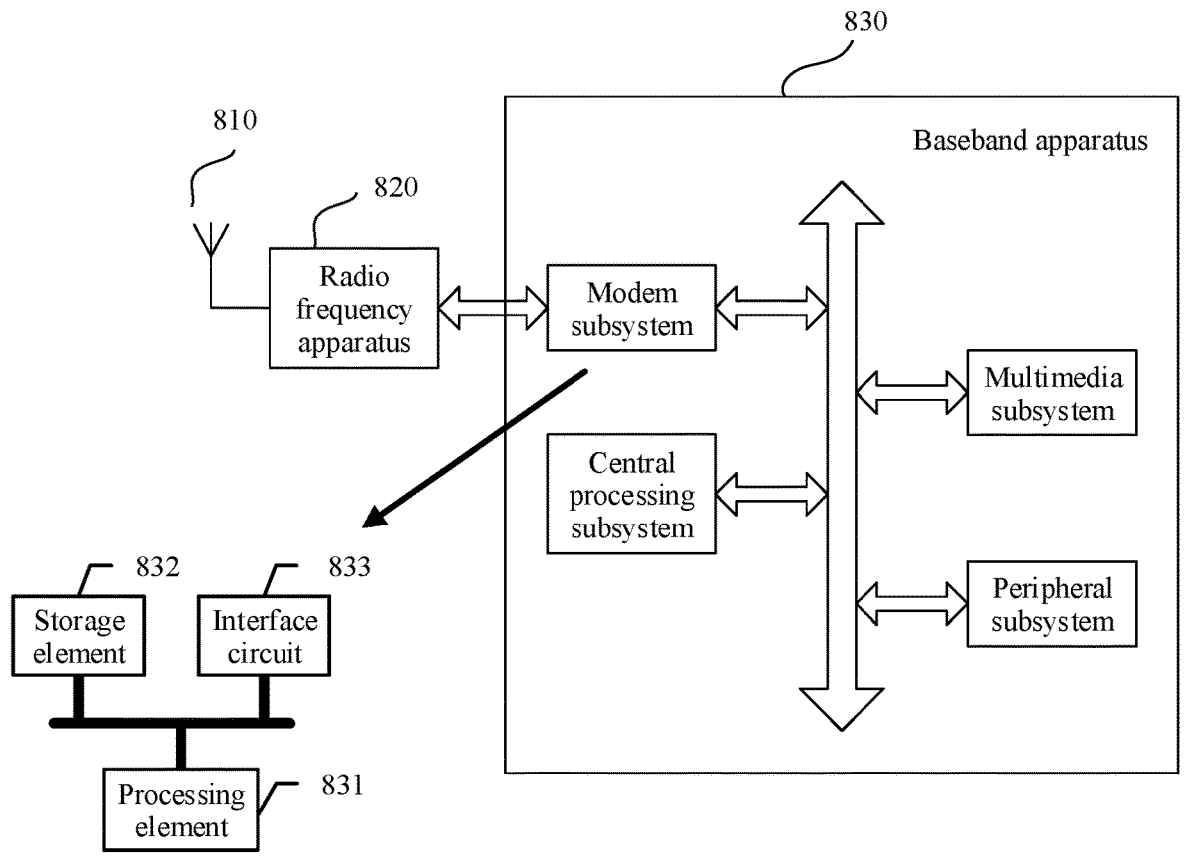
FIG. 15 is a schematic structural diagram of a terminal according to an embodiment of this application.

FIG. 15 is a schematic structural diagram of a terminal according to an embodiment of this application. The terminal may be the terminal in the foregoing embodiments and is configured to implement operations of the terminal in the foregoing embodiments. As shown in FIG. 15, the terminal includes an antenna 810, a radio frequency part 820, and a signal processing part 830. The antenna 810 is connected to the radio frequency part 820. In a downlink direction, the radio frequency part 820 receives, through the antenna 810, information sent by a network device, and sends, to the signal processing part 830 for processing, the information sent by the network device. In an uplink direction, the signal processing part 830 processes information of the terminal, and sends the information to the radio frequency part 820. The radio frequency part 820 processes the information of the terminal, and then sends the processed information to the network device through the antenna 810.

The signal processing part 830 may include a modem subsystem, configured to process data at each communications protocol layer. The signal processing part 830 may further include a central processing subsystem, configured to implement processing of an operating system and an application layer of the terminal. In addition, the signal processing part 830 may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. In an embodiment, the foregoing apparatus used for the terminal may be located in the modem subsystem.

The modem subsystem may include one or more processing elements 831, for example, include one main control CPU and another integrated circuit. In addition, the modem subsystem may further include a storage element 832 and an interface circuit 833. The storage element 832 is configured to store data and a program. However, a program used to perform the methods performed by the terminal in the foregoing methods may not be stored in the storage element 832, but is stored in a memory outside the modem subsystem, and is loaded and used by the modem subsystem when to be used. The interface circuit 833 is configured to communicate with another subsystem. The foregoing apparatus used for the terminal may be located in the modem subsystem. The modem subsystem may be implemented by using a chip. The chip includes at least one processing element and an interface circuit. The processing element is configured to perform the operations of any method performed by the terminal. The interface circuit is configured to communicate with another apparatus. In an embodiment, units of the terminal that implement the operations in the foregoing methods may be implemented by a processing element scheduling a program. For example, an apparatus used for the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In an embodiment, the program used to perform the methods performed by the terminal in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In an embodiment, units of the terminal that implement the operations in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. The integrated circuits may be integrated together to form a chip.

Units of the terminal that implement the operations in the foregoing methods may be integrated together, and implemented in a form of a system-on-a-chip (SOC). The SOC chip is configured to implement the foregoing methods. At least one processing element and a storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing embodiments, functions of some units may be implemented by the processing element invoking a program, and functions of some units may be implemented by the integrated circuit.

It can be learned that the foregoing apparatus used for the terminal may include at least one processing element and an interface circuit. The at least one processing element is configured to perform any one of the methods that are provided in the foregoing method embodiments and performed by the terminal. The processing element may perform some or all operations performed by the terminal, in a first manner, to be specific, by invoking the program stored in the storage element; or may perform some or all operations performed by the terminal, in a second manner, to be specific, by using a hardware integrated logic circuit in the processor element in combination with instructions; or may certainly perform, by combining the first manner and the second manner, some or all operations performed by the terminal.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be a memory, or may be a general term of a plurality of storage elements.

Figure 16:
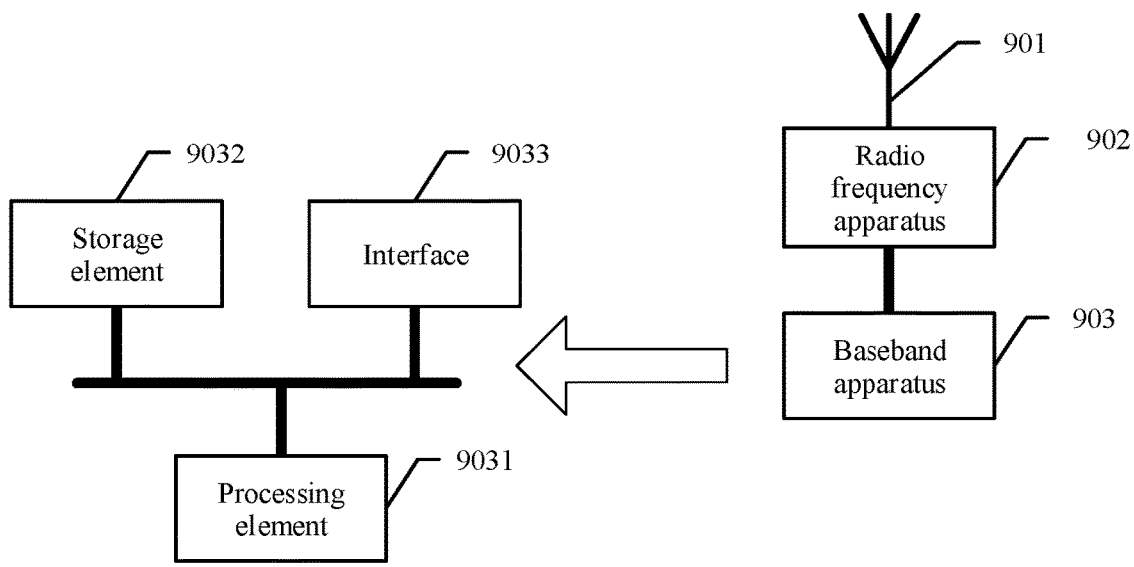
FIG. 16 is a schematic structural diagram of a network device according to an embodiment of this application.

FIG. 16 is a schematic structural diagram of a network device according to an embodiment of this application. The network device is configured to implement operations of the network device in the foregoing embodiments. As shown in FIG. 16, the network device includes an antenna 901, a radio frequency apparatus 902, and a baseband apparatus 903. The antenna 901 is connected to the radio frequency apparatus 902. In an uplink direction, the radio frequency apparatus 902 receives, via the antenna 901, information sent by a terminal, and sends, to the baseband apparatus 903 for processing, the information sent by the terminal. In a downlink direction, the baseband apparatus 903 processes information for the terminal, and sends the information to the radio frequency apparatus 902. The radio frequency apparatus 902 processes the information for the terminal, and then sends the processed information to the terminal via the antenna 901.

The baseband apparatus 903 may include one or more processing elements 9031, for example, include one main control CPU and another integrated circuit. In addition, the baseband apparatus 903 may further include a storage element 9032 and an interface 9033. The storage element 9032 is configured to store a program and data. The interface 9033 is configured to exchange information with the radio frequency apparatus 902, and the interface is, for example, a common public radio interface (CPRI). The foregoing apparatus used for the network device may be located in the baseband apparatus 903. For example, the foregoing apparatus used for the network device may be a chip on the baseband apparatus 903. The chip includes at least one processing element and an interface circuit. The processing element is configured to perform the operations of any one of the methods performed by the network device. The interface circuit is configured to communicate with another apparatus. In an embodiment, units of the network device that implement the operations in the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In an embodiment, units of the network device that implement the operations in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. The integrated circuits may be integrated together to form a chip.

Units of the network device that implement the operations in the foregoing methods may be integrated together, and implemented in a form of a system-on-a-chip (SOC). For example, the baseband apparatus includes the SOC chip, configured to implement the foregoing methods. At least one processing element and a storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing embodiments, functions of some units may be implemented by the processing element invoking a program, and functions of some units may be implemented by the integrated circuit.

It can be learned that the foregoing apparatus used for the network device may include at least one processing element and an interface circuit. The at least one processing element is configured to perform any one of the methods that are provided in the foregoing method embodiments and performed by the network device. The processing element may perform some or all operations performed by the network device, in a first manner, to be specific, by invoking the program stored in the storage element; or may perform some or all operations performed by the network device, in a second manner, to be specific, by using a hardware integrated logic circuit in the processor element in combination with instructions; or may certainly perform, by combining the first manner and the second manner, some or all operations performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be a memory, or may be a general term of a plurality of storage elements.

The terminal and the network device in the foregoing apparatus embodiments may completely correspond to the terminal or the network device in the method embodiments, and a corresponding module or unit performs a corresponding operation. For example, when the apparatus is implemented in a form of a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

An embodiment of this application further provides a communications system. The communications system includes the foregoing terminal and/or the foregoing network device.

In the embodiments of this application, it should be noted that the foregoing method embodiments in the embodiments of this application may be applied to a processor, or may be implemented by a processor. The processor may be an integrated circuit chip and has a signal processing capability. In an embodiment, operations in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the operations, and the logical block diagrams that are disclosed in the embodiments of this application. The general purpose processor may be a microprocessor, or the processor may be any conventional processor or the like. Operations of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and the methods described in this specification includes but is not limited to these and any memory of another proper type.

It should be understood that "one embodiment" or "an embodiment" mentioned in the specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only, that is, B may also be determined according to A and/or other information.

The terms "first", "second", and the like in this application are merely used to distinguish different objects, and "first" and "second" do not limit an actual sequence or functions of objects modified by "first" and "second". Expressions such as "example", "for example", "such as", "optional design", and "a design" in this application are merely used to represent examples, instances, or descriptions. Any embodiment or design scheme described as "example", "for example", "such as", "optional design", or "a design" in this application should not be explained as being more preferred or having more advantages than another embodiment or design scheme. Specifically, using these words is intended to present a related concept in detail.

Terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the "uplink" and the "downlink" are only used to describe transmission directions of data/information, and a device whose specific start point and end point of transmitting the data/information is not limited.

Unless otherwise specified, an expression used in this application similar to an expression that "including at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The foregoing uses three elements A, B, and C as an example to describe an optional entry of the item. When the expression is "the item includes at least one of the following: A, B, . . . , and X", in other words, more elements are included in the expression, the entry to which the item is applicable may also be obtained according to the foregoing rule.

Names may be assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, architectures of the CU and the DU are not limited to the 5G NR gNB, and may be further applied to a scenario in which an LTE base station is divided into the CU and the DU. The CU may be further divided into two parts: a CP and a UP. In an embodiment, in the LTE base station, the protocol layer does not include an SDAP layer.

It should be understood that "one embodiment" or "an embodiment" mentioned in the whole specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only, that is, B may also be determined according to A and/or other information.

The network architecture and the service scenario described in the embodiments of this application are intended to make readers understand the technical solutions in the embodiments of this application more clearly, and do not constitute a limitation on the technical solutions provided in the embodiments of this application. A person of ordinary skill in the art may know that: With evolution of a network architecture and emergence of new service scenarios, the technical solutions provided in the embodiments of this application are also applicable to similar technical problems.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for enabling a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving an uplink grant message from a network device, wherein the uplink grant message comprises first information corresponding to a plurality of transport block sizes;

determining the plurality of transport block sizes based on the first information;

determining, based on a size of data to be sent, a first transport block size from the plurality of transport block sizes; and sending the data to the network device based on the first transport block size, wherein sending the data to the network device based on the first transport block size comprises:

determining a repetition quantity of the data based on the first transport block size and the size of the data to be sent; and sending, on an uplink resource granted by the uplink grant message, the data to the network device for a repetition quantity of times by using the first transport block size.

2. The method according to claim 1, wherein the first information comprises a modulation and coding scheme index corresponding to the plurality of transport block sizes.

3. The method according to claim 1, wherein determining the plurality of transport block sizes based on the first information comprises:

determining the plurality of transport block sizes based on a correspondence between the first information and the plurality of transport block sizes, wherein the correspondence between the first information and the plurality of transport block sizes is preset or from the network device.

4. The method according to claim 1, wherein the plurality of transport block sizes is identified by transport block size indexes.

5. The method according to claim 1, wherein determining a repetition quantity of the data based on the first transport block size comprises:

determining, based on the first transport block size and a correspondence between a transport block size and a repetition quantity, that a repetition quantity corresponding to the first transport block size is the repetition quantity of the data, wherein the correspondence between the transport block size and the repetition quantity is preset or is from the network device.

6. The method according to claim 1, wherein sending the data to the network device for the repetition quantity of times by using the first transport block size comprises:

forming, at a first protocol layer based on the first transport block size, the data into a first protocol layer protocol data unit;

indicating new transmission of a hybrid automatic repeat request (HARQ) process corresponding to the first protocol layer protocol data unit; and indicating, at the first protocol layer, repetition transmission of the first protocol layer protocol data unit in the HARQ process.

7. The method according to claim 1, wherein sending the data to the network device for the repetition quantity of times by using the first transport block size comprises:

forming, at a first protocol layer, the data into a first protocol layer payload for the repetition quantity of times;

forming the first protocol layer payload into a first protocol layer protocol data unit; and indicating new transmission of a HARQ process corresponding to the first protocol layer protocol data unit.

8. The method according to claim 1, wherein sending the data to the network device for the repetition quantity of times by using the first transport block size comprises:

forming, at a first protocol layer, the data into a first protocol layer sub-protocol data unit for the repetition quantity of times;

forming the first protocol layer sub-protocol data unit into a first protocol layer protocol data unit; and indicating new transmission of a HARQ process corresponding to the first protocol layer protocol data unit.

9. The method according to claim 1, wherein the repetition quantity of the data is determined further based on a comparison of the first transport block size to a size of the uplink resource.

10. An apparatus, comprising:

at least one processor configured to invoke a program stored in a memory, wherein the program, when executed by the processor, causes the apparatus to perform operations, the operations comprising:

receiving an uplink grant message from a network device, wherein the uplink grant message comprises first information, and the first information corresponds to a plurality of transport block sizes;

determining the plurality of transport block sizes based on the first information;

determining, based on a size of data to be sent, a first transport block size from the plurality of transport block sizes;

sending the data to the network device based on the first transport block size;

determining a repetition quantity of the data based on the first transport block size and the size of the data to be sent; and sending, on an uplink resource granted by the uplink grant message, the data to the network device for a repetition quantity of times by using the first transport block size.

11. The apparatus according to claim 10, wherein the first information comprises a modulation and coding scheme index corresponding to the plurality of transport block sizes.

12. The apparatus according to claim 10, wherein the operations further comprise:

determining the plurality of transport block sizes based on a correspondence between the first information and the plurality of transport block sizes, wherein the correspondence between the first information and the plurality of transport block sizes is preset or from the network device.

13. The apparatus according to claim 10, wherein the plurality of transport block sizes is identified by transport block size indexes.

14. The apparatus according to claim 10, wherein the operations further comprise:

determining, based on the first transport block size and a correspondence between a transport block size and a repetition quantity, that a repetition quantity corresponding to the first transport block size is the repetition quantity of the data, wherein the correspondence between the transport block size and the repetition quantity is preset or is from the network device.

15. The apparatus according to claim 10, wherein the operations further comprise:

forming, at a first protocol layer based on the first transport block size, the data into a first protocol layer protocol data unit, and indicating new transmission of a hybrid automatic repeat request (HARQ) process corresponding to the first protocol layer protocol data unit; and indicating, at the first protocol layer, repetition transmission of the first protocol layer protocol data unit in the HARQ process.

16. The apparatus according to claim 10, wherein the operations further comprise:
- forming, at a first protocol layer, the data into a first protocol layer payload for the repetition quantity of times; and
- forming the first protocol layer payload into a first protocol layer protocol data unit, and indicating new transmission of a HARQ process corresponding to the first protocol layer protocol data unit.

17. The apparatus according to claim 10, wherein the operations further comprise:
- forming, at a first protocol layer, the data into a first protocol layer sub-protocol data unit for the repetition quantity of times; and
- forming the first protocol layer sub-protocol data unit into a first protocol layer protocol data unit, and indicating new transmission of a HARQ process corresponding to the first protocol layer protocol data unit.

18. The apparatus according to claim 10, wherein the repetition quantity of the data is determined further based on a comparison of the first transport block size to a size of the uplink resource.

19. An apparatus, comprising:
- at least one processor configured to invoke a program stored in a memory, wherein the program, when executed by the processor, causes the apparatus to perform operations, the operations comprising:
- sending an uplink grant message to a terminal, wherein the uplink grant message comprises first information, and the first information corresponds to a plurality of transport block sizes;
- receiving data from the terminal based on a first transport block size, wherein the plurality of transport block sizes comprises the first transport block size; and
- receiving, on an uplink resource granted by the uplink grant message, the data for a repetition quantity of times using the first transport block size, wherein the repetition quantity of times is based on the first transport block size and a size of the data.

20. The apparatus according to claim 19, wherein the operations further comprise:
- sending a correspondence between the first information and the plurality of transport block sizes to the terminal.

\* \* \* \* \*